United States Patent
Noda

(10) Patent No.: US 11,494,082 B2
(45) Date of Patent: Nov. 8, 2022

(54) MEMORY SYSTEM

(71) Applicant: KIOXIA CORPORATION, Tokyo (JP)

(72) Inventor: Yuko Noda, Tokyo (JP)

(73) Assignee: KIOXIA CORPORATION, Tokyo (JP)

(*) Notice: Subject to any disclaimer, the term of this patent is extended or adjusted under 35 U.S.C. 154(b) by 0 days.

(21) Appl. No.: 16/107,890

(22) Filed: Aug. 21, 2018

(65) Prior Publication Data

US 2019/0286338 A1 Sep. 19, 2019

(30) Foreign Application Priority Data

Mar. 19, 2018 (JP) .............................. JP2018-051233

(51) Int. Cl.
*G06F 3/06* (2006.01)
(52) U.S. Cl.
CPC .......... *G06F 3/0613* (2013.01); *G06F 3/0658* (2013.01); *G06F 3/0659* (2013.01); *G06F 3/0688* (2013.01)
(58) Field of Classification Search
CPC .... G06F 3/0613; G06F 3/0658; G06F 3/0659; G06F 3/0688
See application file for complete search history.

(56) References Cited

U.S. PATENT DOCUMENTS

| 7,164,608 | B2* | 1/2007 | Lee | G11C 14/00 365/189.05 |
| 7,383,264 | B2* | 6/2008 | Sutoh | G06F 11/1471 |
| 8,868,851 | B2 | 10/2014 | Lin | |
| 8,996,782 | B2 | 3/2015 | Ide et al. | |
| 9,639,280 | B2 | 5/2017 | Roberts | |
| 10,318,210 | B2 | 6/2019 | Ishii | |

(Continued)

FOREIGN PATENT DOCUMENTS

| JP | 2012523612 A | 10/2012 |
| JP | 5292813 B2 | 9/2013 |

(Continued)

OTHER PUBLICATIONS

Encyclopedia of Production and Manufacturing Managment 2000 Edition "Prioirty Scheduling Rules". (Year: 2000).*

(Continued)

*Primary Examiner* — William E. Baughman
*Assistant Examiner* — Janice M. Girouard
(74) *Attorney, Agent, or Firm* — Kim & Stewart LLP

(57) ABSTRACT

According to one embodiment, a memory system includes a nonvolatile memory including a plurality of memory chips and a controller. The controller acquires a first command from a first queue, transmits the acquired first command to a first memory chip, thereafter acquires a second command from a second queue, and transmit the acquired second command to a second memory chip when a first command processing speed based on a time until execution of a command using the first memory chip is completed after transmission of the command to the first memory chip is started is lower than a second command processing speed based on a time until execution of a command using the second memory chip is completed after transmission of the command to the second memory chip is started.

20 Claims, 22 Drawing Sheets

(56) References Cited

U.S. PATENT DOCUMENTS

| | | | |
|---|---|---|---|
| 10,331,351 B2 | 6/2019 | Asnaashari et al. | |
| 2002/0038407 A1* | 3/2002 | Mounes-Toussi | G06F 12/0815 |
| | | | 711/141 |
| 2006/0059489 A1* | 3/2006 | Koyanagi | G06F 9/52 |
| | | | 718/100 |
| 2007/0101041 A1* | 5/2007 | Atkinson | G06F 13/4072 |
| | | | 710/306 |
| 2007/0260841 A1* | 11/2007 | Hampel | G06F 13/1684 |
| | | | 711/167 |
| 2012/0036512 A1* | 2/2012 | Chung | G06F 9/4881 |
| | | | 718/103 |
| 2013/0212319 A1 | 8/2013 | Hida et al. | |
| 2015/0032915 A1* | 1/2015 | Hur | G06F 3/0613 |
| | | | 710/29 |
| 2015/0187044 A1* | 7/2015 | Torii | G06T 11/00 |
| | | | 345/557 |
| 2016/0004479 A1* | 1/2016 | Hayes | G06F 3/0659 |
| | | | 711/103 |
| 2016/0139820 A1* | 5/2016 | Fluman | G06F 3/065 |
| | | | 711/114 |
| 2016/0371014 A1* | 12/2016 | Roberts | G06F 3/0611 |

FOREIGN PATENT DOCUMENTS

| | | |
|---|---|---|
| JP | 5296041 B2 | 9/2013 |
| JP | 2013200692 A | 10/2013 |
| WO | 2016117190 A1 | 10/2017 |

OTHER PUBLICATIONS

"RIOT The Scheduling Problem" an article Copyright 1999 by Porfessor Dorit S. Hochbaum of Berkley. Available online at https://riot.ieor.berkeley.edu/Applications/Scheduling/algorithms.html (Year: 1999).*

A print screen of the meriam-webster definition for 'associate' taken via archive.org. Currently available online at https://web.archive.org/web/20170816182434/https://www.merriam-webster.com/dictionary/associate (Year: 2017).*

A print screen of the meriam-webster definition for 'couple' taken via archive.org. Currenlty available online at https://web.archive.org/web/20170816182434/https://www.merriam-webster.com/dictionary/couple (Year: 2017).*

Gupta, lecture 19, Carnegie Mellon School of Computer Science, 15-451/651: Algorithms class notes for lecture 19. Attached to this office action and available online at https://www.cs.cmu.edu/~15451-s16/lectures/lec19.pdf (Year: 2016).*

DEC operating system concepts. Digital UNIX Guide to Realtime Programming, published Mar. 1996. (Year: 1996).*

Oracles documentation for "Writing Device Drivers", I/O REquest Handling, Differences between Synchronous and Asynchronous I/O. (Year: 2012).*

University of Illinois—Chicago, Computer Science course notes for Operating Systems, File System Implementation notes. (Year: 2014).*

Japanese Office Action dated Sep. 28, 2021, mailed in counterpart Japanese Application No. 2018-051233, 8 pages (with translation).

* cited by examiner

MEMORY SYSTEM

CROSS-REFERENCE TO RELATED APPLICATION

This application is based upon and claims the benefit of priority from Japanese Patent Application No. 2018-051233, filed Mar. 19, 2018, the entire contents of which are incorporated herein by reference.

FIELD

Embodiments described herein relate generally to a memory system including a nonvolatile memory.

BACKGROUND

In recent years, memory systems based on nonvolatile memory have been widely used.

A solid state drive (SSD) including a NAND flash memory is known. An SSD can be used as a main storage device for some types of computing devices.

In storage systems such as an SSD, many flash memory chips are used. In such storage systems, access performance is improved by executing a chip interleaving processing in which memory chips are accessed in parallel.

DETAILED DESCRIPTION

Embodiments provide a memory system capable of improving access performance to a nonvolatile memory including a plurality of memory chips.

In general, according to one embodiment, a memory system includes a nonvolatile memory and a controller. The nonvolatile memory includes a plurality of memory chips including a first memory chip and a second memory chip that are capable of operating in parallel. The controller includes a plurality of queues including a first queue associated with the first memory chip and a second queue associated with the second memory chip, generates a first command to be executed by the first memory chip and a second command to be executed by the second memory chip, stores the first command in the first queue, and stores the second command in the second queue. The controller acquires the first command from the first queue, transmits the acquired first command to the first memory chip, thereafter acquires the second command from the second queue, and transmits the acquired second command to the second memory chip when a first command processing speed based on a time until execution of a command using the first memory chip is completed after transmission of the command to the first memory chip is started is lower than a second command processing speed based on a time until execution of a command using the second memory chip is completed after transmission of the command to the second memory chip is started. The controller acquires the second command from the second queue, transmits the acquired second command to the second memory chip, thereafter acquires the first command from the first queue, and transmits the acquired first command to the first memory chip when the second command processing speed is lower than the first command processing speed.

Hereinafter, embodiments will be described with reference to the drawings.

First Embodiment

Figure 1:
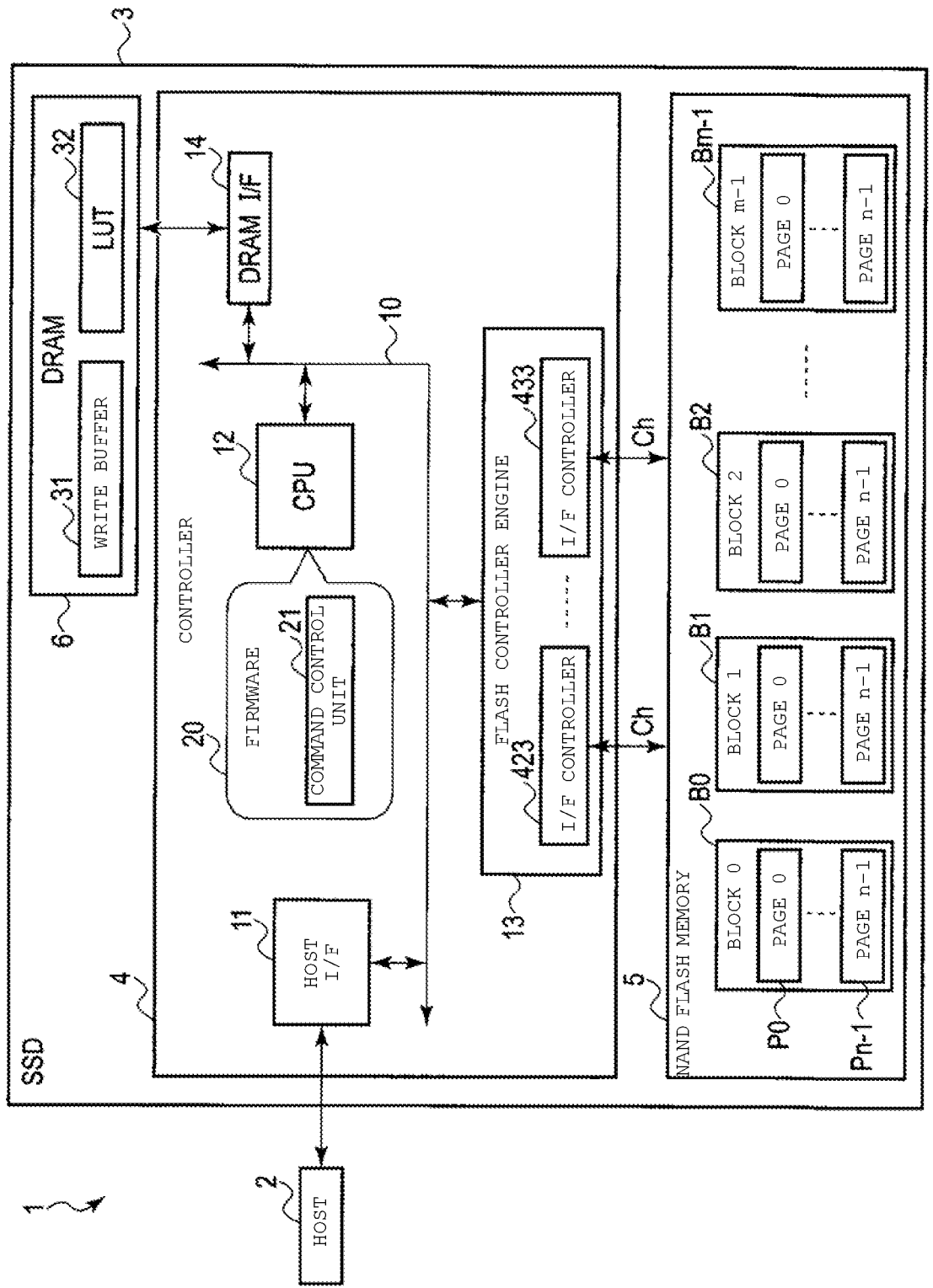
FIG. 1 is a block diagram illustrating a memory system according to a first embodiment.

First, the configuration of an information processing system 1 including a memory system according to a first embodiment will be described with reference to FIGS. 1 and 2.

This memory system is a semiconductor storage device configured to write data in a nonvolatile memory and read data from the nonvolatile memory. This memory system, for example, is implemented as a solid state drive (SSD) 3 including a NAND flash memory.

The information processing system 1 includes a host 2 and the SSD 3. The host 2 is an information processing device, which may be referred to as a computing device, that accesses the SSD 3. The host 2 may be a storage server or a personal computer storing a large amount, and various kinds, of data in the SSD 3.

The SSD 3 may be used as a main storage of the information processing device functioning as the host 2. The SSD 3 may be internal to the information processing device or connected to the information processing device through a cable or a network.

As an interface used for a mutual connection between the host 2 and the SSD 3, a SCSI (Small Computer System Interface), a Serial Attached SCSI (SAS), an ATA, a Serial ATA (SATA), PCI Express® (PCIe), Ethernet®, a Fibre channel, or NVM Express® (NVMe) may be used.

The SSD 3 includes: a controller 4 and a NAND flash memory 5. The controller 4 may be implemented using a circuit such as a system-on-a-chip (SoC). The SSD 3 may include a random access memory that is a volatile memory, for example, a DRAM 6. Alternatively, a random access memory such as an SRAM may be built in the controller 4. In the random access memory, such as the DRAM 6 or the like, a write buffer (WB) 31 that is a buffer area may be used for temporarily storing data to be written in the NAND flash memory 5 and a cache area of a lookup table (LUT) 32, which functions as an address translation table (logical/physical address translation table), are disposed. The LUT 32 manages mapping between each logical address and each physical address of the NAND flash memory 5. Furthermore, the DRAM 6 may be disposed inside the controller 4.

The NAND flash memory 5 includes a memory cell array including a plurality of memory cells arranged in a matrix pattern. This NAND flash memory 5 may be a NAND flash memory of a two-dimensional structure or a NAND flash memory of a three-dimensional structure.

The memory cell array of the NAND flash memory 5 includes a plurality of blocks B0 to Bm-1. Each of the blocks B0 to Bm-1 includes a plurality of pages (pages P0 to Pn-1). Each of the blocks B0 to Bm-1 functions as a minimum erasing unit. A block may be referred to as an "erasing block" or a "physical block" in some instances. Each of the pages P0 to Pn-1 includes a plurality of memory cells connected to the same word line. Each of the pages P0 to Pn-1 is a unit for a data write operation and a data read operation. A word line may be configured as a unit for data write operations and data read operations in some examples.

The controller 4 is electrically connected to the NAND flash memory 5 through a flash controller engine 13 including interface controllers 423 and 433, such as toggle DDRs or open NAND flash interfaces (ONFI). The flash controller engine 13 functions as a NAND control circuit to control the NAND flash memory 5.

Figure 2:
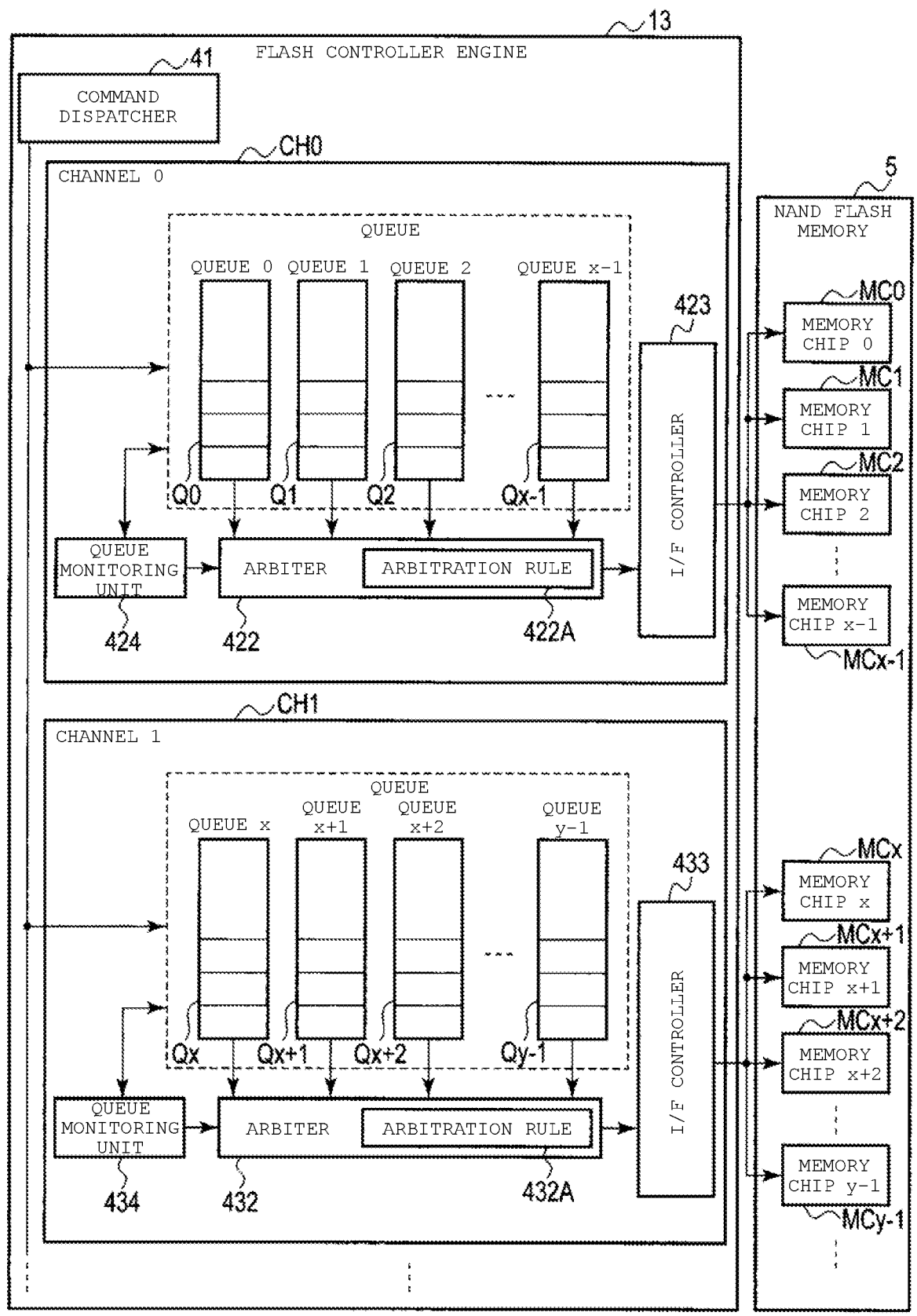
FIG. 2 is a block diagram illustrating the configuration of a flash controller engine and a plurality of NAND flash memory chips inside a memory system according to the first embodiment.

The NAND flash memory 5, as illustrated in FIG. 2, includes a plurality of NAND flash memory chips. The individual NAND flash memory chips can be independently operated. For this reason, the NAND flash memory chips function as units that can be operated in parallel. Hereinafter, the NAND flash memory chips will be referred to as memory chips.

The flash controller engine 13 is connected to one or more memory chips inside the NAND flash memory 5 through one or more channels. FIG. 2 illustrates a case in which a plurality of channels (CH0, CH1, and so forth) are connected to the same command dispatcher 41. Each of the plurality of channels (CH0, CH1, etc.) is connected a plurality of NAND flash memory chips, as an example.

More specifically, NAND flash memory chips MC0 to MCx−1 are connected to the channel CH0. The NAND flash memory chips MCx to MCy−1 are connected to the channel CH1. In the example illustrated in FIG. 2, NAND flash memory chips MC0 to MCy−1 can be operated in parallel.

Next, the configuration of a controller 4 (see FIG. 1) will be described.

The controller 4 is electrically connected to a NAND flash memory 5, which is a plurality of NAND flash memory chips, through a plurality of channels. The controller 4 controls the NAND flash memory 5.

The controller 4 may function as a flash translation layer (FTL) configured to execute data management and block management of the NAND flash memory 5. The data management executed by the FTL includes (1) management of mapping information representing correspondence between each logical address and each physical address of the NAND flash memory 5, (2) a process for concealing read/write in units of pages and an erasing operation in units of blocks, and the like. Logical addresses are addresses that are used by a host for addressing the SSD 3. As the logical addresses, logical block addresses are used.

The management of mapping between each logical block address (LBA) and each physical address is executed using a LUT 32 functioning as an address translation table (logical/physical address translation table). The controller 4 manages the mapping between each LBA and physical addresses in units of a predetermined management size by using the LUT 32. A physical address corresponding to a certain LBA represents an actual, physical storage position inside the NAND flash memory 5 to which data of the LBA was, or is to be, written. The LUT 32 may be loaded from the NAND flash memory 5 into the DRAM 6 when the power of the SSD 3 is turned on.

Writing data into a page can be performed only once per one program/erase (P/E) cycle. For this reason, the controller 4 writes update data corresponding to a certain LBA rather than at the physical storage position (physical address) at which old data for the LBA was stored but to a another physical storage position. Then, the controller 4 associates the LBA with the new physical storage position by updating the LUT 32 and invalidates the old data. Data referenced in the LUT 32 (in other words, the data at physical addresses that are specifically associated with a logical address in the LUT 32) is referred to as valid data. Any data at a physical address that is not associated with a logical address is referred to as invalid data. Here, valid data is data having a possibility of being read/accessed by the host 2 later. On the other hand, invalid data is data having no possibility of being read/accessed again by the host 2.

The block management includes management of bad blocks, wear leveling, garbage collection (GC), and the like. The wear leveling is an operation for uniformizing wearing levels amongst the physical blocks. In the garbage collection, in order to increase the number of free blocks (free logical blocks) in which data can be written, valid data from target blocks (target logical blocks) mixed with invalid data is moved to other blocks.

Then, the controller 4 performs mapping of each LBA of moved valid data to the new physical addresses by updating the LUT 32. By moving valid data to other blocks, a block in which only invalid data is present is released as a free block. Accordingly, the block can be reused after the erasing.

The controller 4 may include: a host interface 11, a CPU 12, the flash controller engine 13, a DRAM interface 14, and the like. The host interface 11, the CPU 12, the flash controller engine 13, and the DRAM interface 14 may be interconnected through a bus 10.

The host interface 11 functions as a circuit that receives various commands, for example, I/O commands, various control commands, and the like from the host 2. The I/O commands may include a write command, a read command, an unmap command (e.g., TRIM command), a format command, a flash command, and the like. The format command is a command that is used for unmapping the whole memory system (SSD 3). The flash command is a command for causing the whole memory system to be in a clear state by writing dirty data (user data and related management data) cached (buffered) inside the memory system to the NAND flash memory 5.

The DRAM interface 14 functions as a DRAM controller configured to control accesses to the DRAM 6. The storage area of the DRAM 6, as described above, is used for storing the WB 31, the LUT 32, and the like. The storage area of the DRAM 6 may be further used for storing a GC buffer used for GC.

The CPU 12 is a processor configured to control the host interface 11, the flash controller engine 13, and the DRAM interface 14. The CPU 12 performs various processes by executing firmware 20, also referred to as control program 20, stored in a ROM (not separately illustrated). The CPU 12, in addition to the process of the FTL described above, can execute command processes for processing various commands transmitted from the host 2 and the like. The operation of the CPU 12 is controlled by the firmware 20 executed by the CPU 12. In some examples, the FTL process and some or all of the command processes may be executed using dedicated hardware inside the controller 4.

The CPU 12 may function as a command control unit 21 by executing the firmware 20.

The command control unit 21 receives a command from the host 2 and controls units inside the controller 4 in accordance with the command. The commands received from the host 2, are a write command, a read command, and the like. In a case where the received command is a command requesting an access to the NAND flash memory 5, the command control unit 21 sends a command according to the content of the access to the flash controller engine 13.

In addition, in a case where an access to the NAND flash memory 5 is required in accordance with an internal operation of the SSD 3, such as a garbage collection operation, the command control unit 21 may send a command according to the content of the access to the flash controller engine 13. Examples of the command sent to the flash controller engine 13 include a program command, a read command, an erase command, and the like.

More specifically, in a case where a write command is received from the host 2, the command control unit 21 determines physical addresses (physical address range) corresponding to an LBA range (for example, a start LBA and an end LBA or a size) designated by the write command and accumulates user data received in accordance with the write command in the write buffer 31 of the DRAM 6. Then, the command control unit 21 sends a program command to the flash controller engine 13 for writing user data at a physical address corresponding to the designated LBA range. When the writing of the user data is completed, the command control unit 21 updates the LUT 32 to represent a correspondence between the LBA range designated by the write command and physical addresses at which the user data was written.

In addition, in a case where a read command is received from the host 2, the command control unit 21 translates an LBA range (for example, a start LBA and an end LBA or a size) designated by the read command into physical addresses using the LUT 32. Then, the command control unit 21 sends a read command used for reading data stored at the physical addresses acquired through this translation to the flash controller engine 13. When data reading is completed, the command control unit 21 transmits the read data to the host 2.

In addition, for example, in a case in which one of free blocks (free logical blocks) is selected and is used as a write destination block, in order to perform an erase process for the selected free block, the command control unit 21 sends an erase command for causing all the memory cells inside each physical block in the free block to be in an erased state to the flash controller engine 13. In the erase command, an address of a physical block for which an erasing operation is to be executed is designated. A free block can be allocated as a write destination block through an erase process.

FIG. 2 illustrates the configuration of the flash controller engine 13. The flash controller engine 13 includes a command dispatcher 41 and one or more channels CH0 and CH1. Each of the channels CH0 and CH1 is connected to a plurality of memory chips inside the NAND flash memory 5.

In the example illustrated in FIG. 2, the channel CH0 is connected to a plurality of memory chips MC0, MC1, MC2 . . . MCx−1, and the channel CH1 is connected to a plurality of memory chips MCx, MCx+1 . . . MCy−1. The flash controller engine 13 can operate a plurality of memory chips connected to each of the channels CH0 and CH1 in parallel by executing chip interleaving for each of the channels CH0 and CH1.

The channel CH0 includes: a plurality of queues (command queues) Q0, Q1, Q2 . . . Qx−1; an arbiter 422; an interface controller (I/F controller) 423; and a queue monitoring unit 424. In addition, the channel CH1 includes: a plurality of queues Qx, Qx+1, Qx+2 . . . Qy−1; an arbiter 432; an I/F controller 433; and a queue monitoring unit 434.

The plurality of queues Q0, Q1, Q2 . . . Qx−1 respectively correspond to the plurality of memory chips MC0, MC1, MC2 . . . MCx−1 connected to the I/F controller 423 of the channel CH0. In other words, the queue Q0 is associated with the memory chip MC0, the queue Q1 is associated with the memory chip MC1, the queue Q2 is associated with the memory chip MC2, and the queue Qx−1 is associated with the memory chip MCx−1.

Similarly, the plurality of queues Qx, Qx+1, Qx+2 . . . Qy−1 respectively correspond to the plurality of memory chips MCx, MCx+1 . . . MCy−1 connected to the I/F controller 433 of the channel CH1. In other words, the queue Qx is associated with the memory chip MCx, the queue Qx+1 is associated with the memory chip MCx+1, the queue Qx+2 is associated with the memory chip MCx+2, and the queue Qy−1 is associated with the memory chip MCy−1.

Each queue can store a command sequence transmitted (sent) to a corresponding memory chip. In each of the channels CH0 and CH1, by providing a plurality of queues corresponding to a plurality of memory chips, chip interleaving can be efficiently executed.

Furthermore, a plurality of memory chips may be associated with one queue. In such a case, one queue stores command sequences transmitted to a plurality of corresponding memory chips.

The command dispatcher 41 receives a command sent to the flash controller engine 13 and stores the command in a queue corresponding to a memory chip accessed in accordance with the command. More specifically, the command dispatcher 41 specifies a memory chip including a physical storage position (area) represented by a physical address based on the physical address designated by the received command. Then, the command dispatcher 41 stores the command in one queue corresponding to the specified memory chip.

For example, when a command for designating a physical address inside the memory chip MC0 is received, the command dispatcher 41 stores the command in the queue Q0 corresponding to the memory chip MC0. When a command for designating a physical address inside the memory chip MC1 is received, the command dispatcher 41 stores the command in the queue Q1 corresponding to the memory chip MC1. When a command for designating a physical address inside the memory chip MC2 is received, the command dispatcher 41 stores the command in the queue Q2 corresponding to the memory chip MC2. In addition, when a command for designating a physical address inside the memory chip MCx−1 is received, the command dispatcher 41 stores the command in the queue Qx−1 corresponding to the memory chip MCx−1.

Similarly, when a command for designating a physical address inside the memory chip MCx is received, the command dispatcher 41 stores the command in the queue Qx corresponding to the memory chip MCx. When a command for designating a physical address inside the memory chip MCx+1 is received, the command dispatcher 41 stores the command in the queue Qx+1 corresponding to the memory chip MCx+1. When a command for designating a physical address inside the memory chip MCx+2 is received, the command dispatcher 41 stores the command in the queue Qx+2 corresponding to the memory chip MCx+2. In addition, when a command for designating a physical address inside the memory chip MCy−1 is received, the command dispatcher 41 stores the command in the queue Qy−1 corresponding to the memory chip MCy−1.

In this way, a command is stored (accumulated) in each of the plurality of queues provided in each of the channels CH0 and CH1.

The arbiters 422 and 432 manage arbitration rules 422A and 432A representing an ordering of queues that become command transmission targets (or transmission sources) in each of the channels CH0 and CH1. The arbiters 422 and 432 function so as to sequentially transmit one of the commands inform each queue to a memory chip corresponding to that queue through the I/F controllers 423 and 433 in accordance with the ordering of queues defined by the arbitration rules 422A and 432A. Furthermore, the arbitration rules 422A and 432A, for example, may be stored in specific storage areas provided inside the channels CH0 and CH1 and be loaded from the NAND flash memories 5 to the specific storage areas when the power of the SSD 3 is turned on.

The I/F controllers 423 and 433 perform control such that a transmitted command is sent to a memory chip including a physical address designated by the command. The transmitted command is then deleted from the queue in which it was stored.

In addition, the I/F controllers 423 and 433 may detect completion of the execution of the command by monitoring a ready/busy signal (RY/BY) and/or detecting an operation success/failure or the like by sending a status read command to the memory chip.

A memory chip receiving the transmitted command executes the command and performs an operation according to the command. More specifically, for example, a memory chip receiving a program command performs a data write operation of writing user data received in accordance with the program command at a designated physical address (physical storage position). A memory chip receiving a read command performs a data read operation of reading data from a designated physical address. In addition, a memory chip receiving an erase command performs an erasing operation of erasing data of a designated physical address.

As above, commands are executed in parallel in a plurality of memory chips corresponding to a plurality of queue provided in a certain channel.

The queue monitoring units 424 and 434, for example, measure a command processing speed, which is based on a time until execution of a command using a memory chip is completed after transmission of the command to the corresponding memory chip from a queue is started, for each set of a queue and a memory chip associated with each other. The queue monitoring units 424 and 434 measure a command processing time until execution of a command using a memory chip is completed after transmission of the command to the corresponding memory chip is started for each command within a unit period during execution of chip interleaving for each queue. Then, a command processing speed for each set of a queue and a memory chip is calculated based on an average value, a maximum value, a minimum value, or the like of several command processing times measured during the unit period. Furthermore, hereinafter, a command processing speed of a set of a queue and a memory chip will be also referred to as a command processing speed of the queue or a command processing speed of the memory chip.

The queue monitoring units 424 and 434 can detect a process start position representing a time point at which a command is transmitted from a queue to a corresponding memory chip and a process end position representing a time point at which execution of the command using the memory chip is completed. The command processing time corresponds to an elapsed time from the process start position to the process end position. For example, by reading a register representing a state of each queue or a memory chip corresponding to the queue, the queue monitoring units 424 and 434 detect a process start position and a process end position of a command.

Alternatively, the queue monitoring units 424 and 434 may measure a transmission speed of a command transmitted from a queue to a corresponding memory chip (command transmission speed) for each queue. The queue monitoring units 424 and 434, for each queue, within a unit period during execution of chip interleaving, count the number of commands transmitted from the queue to a corresponding memory chip. Then, the queue monitoring units 424 and 434 calculates (determines) a command transmission speed using the number of the counted commands.

More specifically, the queue monitoring units 424 and 434 count at least one of the number of process start positions and the number of process end positions of commands transmitted from a certain queue to a corresponding memory chip in a unit period. Then, the queue monitoring units 424 and 434 determine (calculate) a command transmission speed using at least one of the number of counted process start positions and the number of counted process end positions of commands.

Furthermore, also in a case where a plurality of memory chips are associated with one queue, similarly, the queue monitoring units 424 and 434 can calculate a command processing speed or a command transmission speed for each set of a queue and a memory chip associated with each other.

The arbiters 422 and 432 may change the arbitration rules 422A and 432A such that the order of queues that become targets for command transmission corresponds to the order of lowest to highest command processing speed or command transmission speed based on the command processing speed or the command transmission speed of each queue acquired by the queue monitoring units 424 and 434.

For example, a case will be assumed in which a first memory chip and a second memory chip are included in a plurality of memory chips that are connected to the channel CH0 and can operate in parallel. The command control unit 21 generates a first command to be executed by the first memory chip and a second command to be executed by a second memory chip in accordance with a command received from the host 2 or the like and sends the generated commands to the flash controller engine 13.

The command dispatcher 41 stores the first command in a first queue associated with the first memory chip and stores the second command in a second queue associated with the second memory chip. Then, by following the arbitration rule 422A, the arbiter 422 operates as below.

(1) Ina case where a first command processing speed based on a time until execution of a command using the first memory chip is completed after start of transmission of the command to the first memory chip is lower than a second command processing speed based on a time until execution of a command using the second memory chip is completed after start of transmission of the command to the second memory chip, the arbiter 422 acquires the first command from the first queue, transmits the acquired first command to the first memory chip, thereafter acquires the second command from the second queue, and transmits the acquired second command to the second memory chip. In addition, (2) in a case where the second command processing speed is lower than the first command processing speed, the arbiter 422 acquires the second command from the second queue, transmits the acquired second command to the second memory chip, thereafter acquires the first command from the first queue, and transmits the acquired first command to the first memory chip.

The first and second command processing speeds may be measured when a third command to be executed by the first memory chip and a fourth command to be executed by the second memory chip are processed. More specifically, the command dispatcher 41 stores the third command in the first queue and stores the fourth command in the second queue. The queue monitoring unit 424 acquires the third command from the first queue and measures a first command processing speed based on a time until execution of the third command using the first memory chip is completed after transmission of the acquired third command to the first memory chip. In addition, the queue monitoring unit 424 acquires the fourth command from the second queue and measures a second command processing speed based on a time until execution of the fourth command using the second memory chip is completed after transmission of the acquired fourth command to the second memory chip.

Alternatively, the arbiter 422 may operate as below.

(1) in a case where a first command transmission speed based on the number of commands transmitted to the first memory chip in a first period is lower than a second command transmission speed based on the number of commands transmitted to the second memory chip in the first period, the arbiter 422 acquires the first command from the first queue, transmits the acquired first command to the first memory chip, thereafter acquires the second command from the second queue, and transmits the acquired second command to the second memory chip. In addition, (2) in a case where the second command transmission speed is lower than the first command transmission speed, the arbiter 422 acquires the second command from the second queue, transmits the acquired second command to the second memory chip, thereafter acquires the first command from the first queue, and transmits the acquired first command to the first memory chip.

The first and second command transmission speeds may be measured when a plurality of third command to be executed by the first memory chip and a plurality of fourth commands to be executed by the second memory chip are processed. More specifically, the queue monitoring unit 424, in a first period, counts a first number of commands transmitted to the first memory chip among a plurality of third commands stored in the first queue and counts a second number of commands transmitted to the second memory chip among a plurality of fourth commands stored in the second queue. The queue monitoring unit 424 determines a first command transmission speed based on the counted first number and determines a second command transmission speed based on the counted second number.

Furthermore, in a case where the first command is a program command used for writing first data in the first memory chip, and the second command is a program command used for writing second data in the second memory chip, the arbiter 422 operates as below. In other words, (1) in a case where the first command processing speed is lower than the second command processing speed or a case in which the first command transmission speed is lower than the second command transmission speed, the arbiter 422, after instructing the first memory chip to execute program by transmitting the first data to the first memory chip, instructs the second memory chip to execute program by transmitting the second data to the second memory chip. In addition, (2) in a case where the second command processing speed is lower than the first command processing speed or a case in which the second command transmission speed is lower than the first command transmission speed, the arbiter 422, after instructing the second memory chip to execute program by transmitting the second data to the second memory chip, instructs the first memory chip to execute program by transmitting the first data to the first memory chip.

Figure 3A:
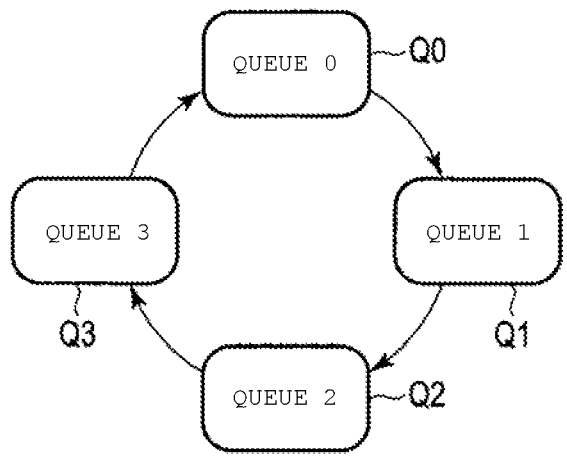
FIGS. 3A and 3B are diagrams illustrating an example of an arbitration rule used by a flash controller engine and an example in which commands transmitted from command queues in accordance with the arbitration rule are executed in parallel.
Figure 3B:
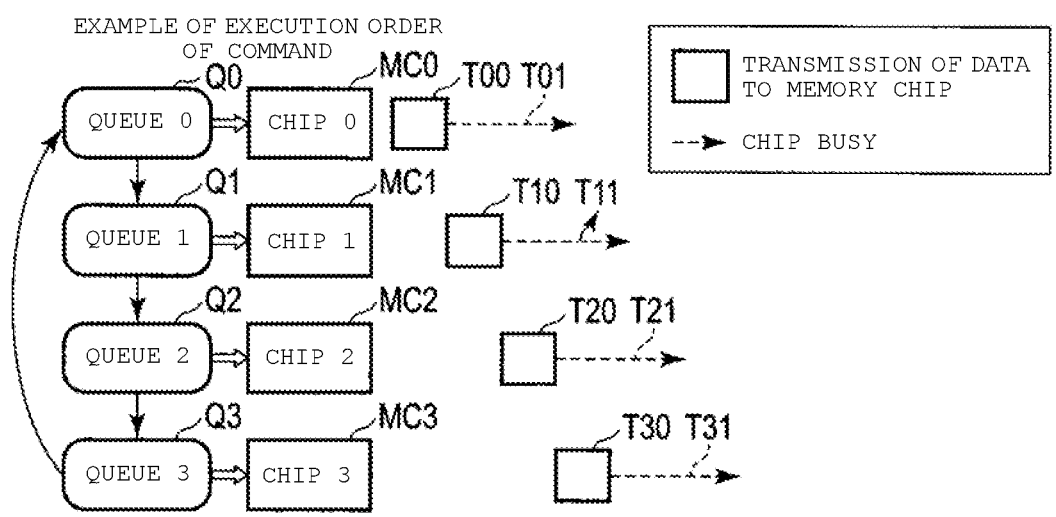

Hereinafter, for easy understanding of description, as illustrated in FIGS. 3A and 3B, a case in which four queues Q0 to Q3 are provided in a channel CH0 will be mainly described. These four queues Q0 to Q3 respectively correspond to four memory chips MC0 to MC3 provided in the NAND flash memory 5. FIGS. 3A and 3B respectively illustrate an example of the arbitration rule 422A and an example in which commands transmitted in the order of queues defined in the arbitration rule 422A are executed in parallel in memory chips MC0 to MC3.

FIG. 3A illustrates an example of the order of queues that become targets for command transmission that is defined in the arbitration rule 422A. In FIG. 3A, a command arbitration rule of round-robin that is the order of queues Q0, Q1, Q2, and Q3 is defined.

In addition, FIG. 3B illustrates that one of commands stored in each queue is transmitted to a corresponding memory chip in order of queues represented in the arbitration rule 422A. A command transmitted from each queue, for example, is a command of which a timing stored in the queue is the earliest among one or more commands (command sequence) stored in the queue.

More specifically, as illustrated in FIG. 3B, in a case where a command (for example, a program command) stored in the first queue Q0 is transmitted to a corresponding memory chip MC0 in accordance with the arbitration rule 422A, after a data transmission period T00 in which data according to the command is transmitted to the memory chip MC0, the memory chip MC0 is in a busy state (chip busy) in a period T01 of an operation (for example, a data write operation) according to the command. In other words, for the process of one command transmitted from the queue Q0 to the memory chip MC0, a time (command processing time) including the data transmission period T00 and the period T01 of the operation according to the command is necessary. The period of the operation is a command execution time using a memory chip and is also referred to as a chip busy period.

Thereafter, in accordance with completion of the data transmission period T00 for the memory chip MC0, a command stored in a queue Q1 following the queue Q0 is transmitted to a corresponding memory chip MC1. In such a case, after the data transmission period T10 in which data according to the command is transmitted to the memory chip MC1, the memory chip MC1 is in the busy state in the period T11 of an operation according to the command. In other words, for the process of one command transmitted from the queue Q1 to the memory chip MC1, a time including the data transmission period T10 and the period T11 of the operation according to the command is necessary.

Then, in accordance with completion of the data transmission period T10 for the memory chip MC1, a command stored in a queue Q2 following the queue Q1 is transmitted to a corresponding memory chip MC2. In such a case, after a data transmission period T20 in which data according to the command is transmitted to the memory chip MC2, the memory chip MC2 is in the busy state in a period T21 of an operation according to the command. In other words, for the process of one command transmitted from the queue Q2 to the memory chip MC2, a time including the data transmission period T20 and the period T21 of the operation according to the command is necessary.

In addition, in accordance with completion of the data transmission period T20 for the memory chip MC2, a command stored in a queue Q3 following the queue Q2 is transmitted to a corresponding memory chip MC3. In such a case, after a data transmission period T30 in which data according to the command is transmitted to the memory chip MC3, the memory chip MC3 is in the busy state in a period T31 of an operation according to the command. In other words, for the process of one command transmitted from the queue Q3 to the memory chip MC3, a time including the data transmission period T30 and the period T31 of the operation according to the command is necessary.

In the example described above, the arbiter 422 processes commands transmitted from a plurality of queues to a plurality of corresponding memory chips in parallel (execution of chip interleaving) with a timing of process start (transmission start) of a command shifted by the data transmission period between queues of which transmission order is consecutive. In other words, a data transmission period of a command transmitted from a certain queue and a data transmission period of a command transmitted from a following queue are continuous, and thus, there is no delay between these two data transmission periods.

Figure 4:
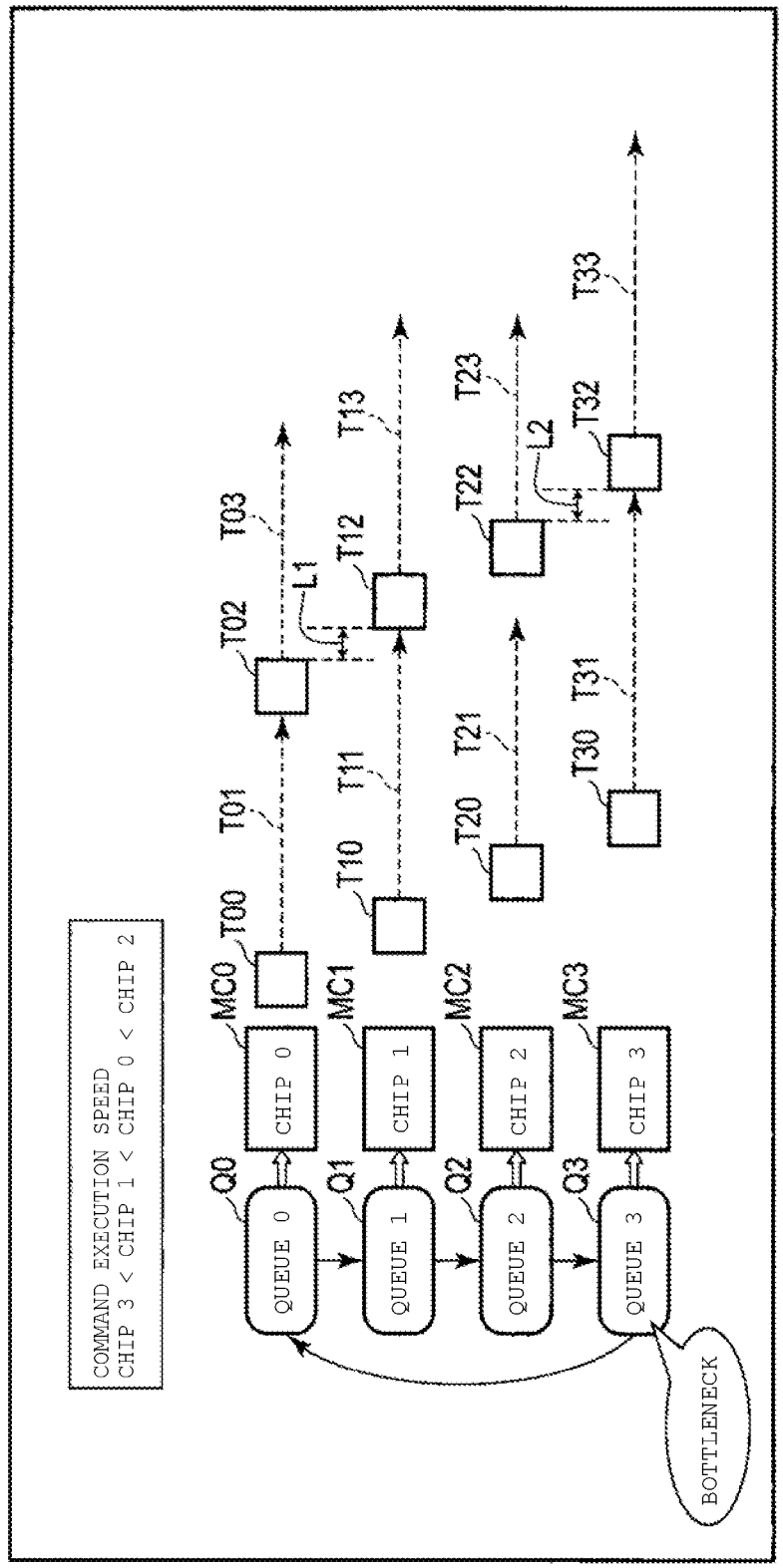
FIG. 4 is a diagram illustrating an example in which commands are executed in parallel by a plurality of memory chips based on an arbitration rule ordering made regardless of command execution speeds of memory chips in the memory system.

On the other hand, as illustrated in FIG. 4, a case will be considered in which operation periods T01, T11, T21, and T31 according to execution of commands of a certain type (for example, program commands) are different for memory chips MC0 to MC3, and there are variations. More specifically, a case will be considered in which command execution speeds (for example, program speeds) of the plurality of memory chips MC0 to MC3 are lower in order of memory chips MC3, MC1, MC0, and MC2 (MC3<MC1<MC0<MC2).

In the example illustrated in FIG. 4, when a second command is transmitted from a queue Q0 to the memory chip MC0, regardless of completion of a data transmission period T02 in which data according to this command is transmitted to the memory chip MC0, a second command is not transmitted from a following queue Q1 to the memory chip MC1. The reason for this is that, when the data transmission period T02 is completed, execution of a first command using the memory chip MC1 corresponding to the queue Q1 is not completed, and thus the memory chip MC1 is in the busy state (T11).

For this reason, transmission of the second command from the following queue Q1 to the memory chip MC1 is started in accordance with completion of execution of the first command using the memory chip MC1 (in other words, completion of an operation period T11 according to the first command). Accordingly, until a data transmission period T12 for the memory chip MC1 is started after completion of the data transmission period T02 for the memory chip MC0, a delay time L1 occurs.

Similarly, when a second command is transmitted from a queue Q2 to the memory chip MC2, regardless of completion of a data transmission period T22 in which data according to this command is transmitted to the memory chip MC2, a second command is not transmitted from a following queue Q3 to the memory chip MC3. The reason for this is that, when the data transmission period T22 is completed, execution of a first command using the memory chip MC3 corresponding to the queue Q3 is not completed, and thus the memory chip MC3 is in the busy state (T31).

For this reason, transmission of the second command from the following queue Q3 to the memory chip MC3 is started in accordance with completion of execution of the first command using the memory chip MC3 (in other words, completion of an operation period T31 according to the first command). Accordingly, until a data transmission period T32 for the memory chip MC3 is started after completion of the data transmission period T22 for the memory chip MC2, a delay time L2 occurs.

As above, even when corresponding queues Q1 and Q3 are in sequence for transmission of a new command, the memory chips MC1 and MC3 having low command execution speeds are in the busy state, and accordingly, new commands cannot be transmitted from the queues Q1 and Q3 to the memory chips MC1 and MC3. In accordance with the delay times L1 and L2 occurring from this, the whole access performance of the plurality of the memory chips MC0 to MC3 connected to the channel CH0 is degraded. In other words, the memory chips MC1 and MC3 having low command execution speeds become a bottleneck that degrades the whole access performance of the plurality of the memory chips MC0 to MC3 connected to the channel CH0.

For this reason, in this embodiment, the order of queues that become targets for command transmission (arbitration rule) is dynamically changed based on a command processing speed or a command transmission speed of each queue. As described above, a command processing speed is a speed based on a time until execution of a command using a memory chip is completed after start of transmission of the command from a queue to the corresponding memory chip. In addition, the command transmission speed is a speed based on the number of commands transmitted from a queue to a memory chip within a unit period.

Figure 5:
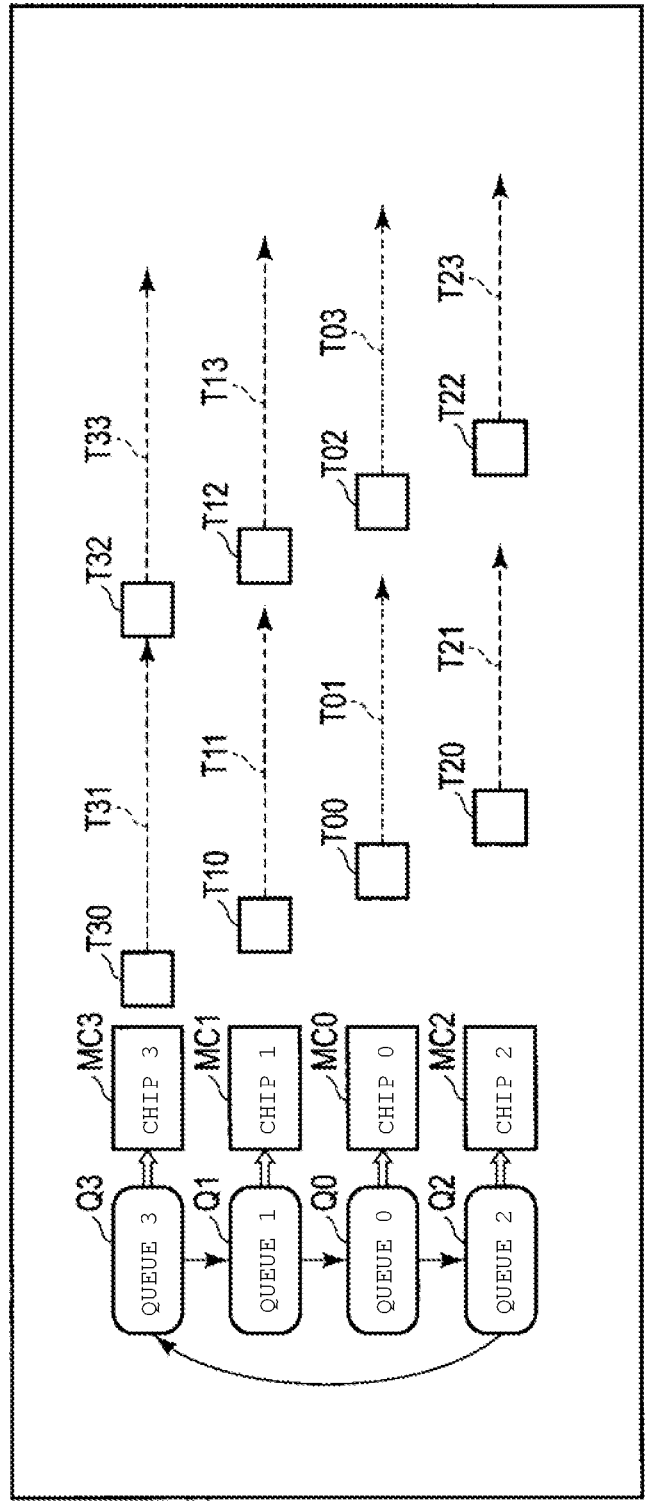
FIG. 5 is a diagram illustrating an example in which commands are executed in parallel with an ordering starting from a memory chip having a lowest command processing speed in the memory system.

In the example illustrated in FIG. 5, in a case where command execution speeds (for example, program speeds) of a plurality of memory chips are lower in order of memory chips MC3, MC1, MC0, and MC2 (MC3<MC1<MC0<MC2), a command arbitration rule of round robin in order of queues Q3, Q1, Q0, and Q2 is defined. The order of queues in which a command becomes a transmission target corresponds to an order of lowest to highest command execution speeds of corresponding memory chips. Accordingly, when the data transmission period is constant, the order of queues in which a command becomes a transmission target corresponds to an order of lowest to highest command processing speed.

In such a case, in accordance with completion of a data transmission period T32 in which a second command (data according to the second command) is transmitted from a queue Q3 to the corresponding memory chip MC3, a second command can be transmitted from a following queue Q1 to the memory chip MC1. In other words, when the data transmission period T32 is completed, execution of a first command using the memory chip MC1 corresponding to the following queue Q1 is completed, and accordingly, the second command can be transmitted from the following queue Q1 to the memory chip MC1 without occurrence of a delay time.

This similarly applies also to a case of being between other queues of which the orders are continuous.

Accordingly, by causing the order of queues in which a command becomes a transmission target to correspond to an order of lowest to highest command execution speeds of corresponding memory chips, the whole access performance of a plurality of memory chips MC0 to MC3 connected to the channel CH0 can be improved more than that of the case of the example illustrated in FIG. 4.

Figure 6:
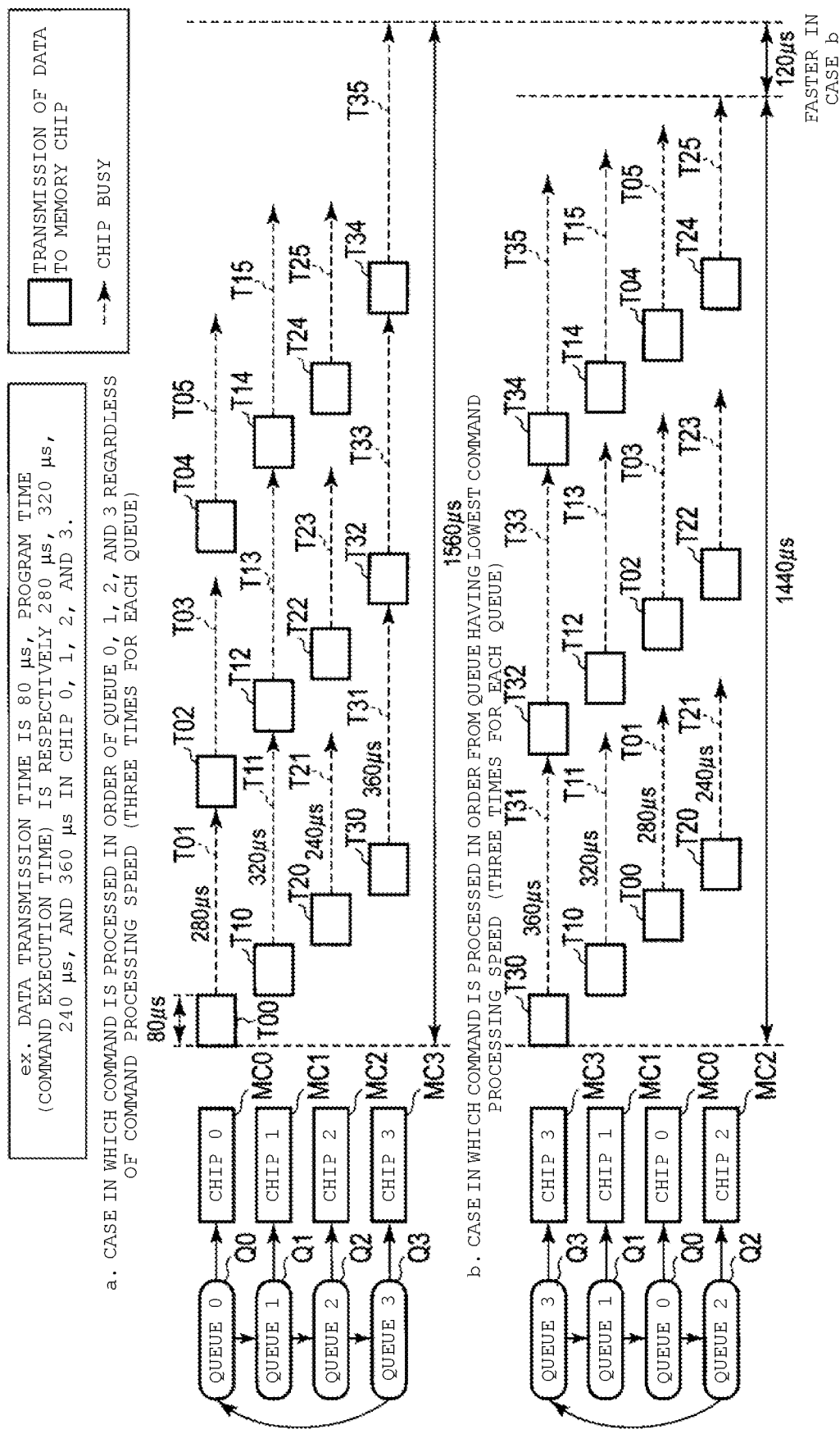
FIG. 6 is a diagram illustrating a comparison between an example in which commands are executed in parallel by a plurality of memory chips in an ordering made without regard to command processing speeds and an example in which commands are executed in parallel in an ordering starting with a memory chip having the lowest command processing speed in the memory system.

FIG. 6 illustrates a specific example in which the whole access performance of a plurality of memory chips MC0 to MC3 connected to a channel CH0 is improved in a case where the order of queues in which a command becomes a transmission target is changed based on a command processing speed (command execution speed). Here, a case will be described as an example in which program commands are transmitted from queues Q0 to Q3 to the memory chips MC0 to MC3.

Here, it is assumed that a data transmission period in which data according to a command is transmitted to the memory chips MC0 to MC3 is 80 microseconds (µs) which is constant, a program time using the memory chip MC0 is 280 µs, a program time using the memory chip MC1 is 320 µs, a program time using the memory chip MC2 is 240 µs, and a program time using the memory chip MC3 is 360 µs. Furthermore, a program time is an operation period of a memory chip executing a transmitted command program. In other words, the program time is a period in which a corresponding memory chip is operated and maintained to be in the busy state in accordance with transmission of a program command. Accordingly, the program speeds (command execution speeds) of the memory chips MC0 to MC3 are slower in order of the memory chips MC3, MC1, MC0, and MC2. In addition, the command processing speed is slower in order of the memory chip MC3 (queue Q3), the memory chip MC1 (queue Q1), the memory chip MC0 (queue Q0), and the memory chip MC2 (queue Q2).

First, (a) a case will be described in which program commands are respectively transmitted to corresponding memory chips MC0, MC1, MC2, and MC3 in order of queues Q0, Q1, Q2, and Q3 regardless of the command processing speed. In this case, similar to the example illustrated in FIG. 4, even when it is in sequence for transmission of new commands from the corresponding queues Q1 and Q3, the memory chips MC1 and MC3 having slow program speeds are in the busy state, and accordingly, a situation occurs in which new commands cannot be transmitted from the queues Q1 and Q3 to the memory chips MC1 and MC3.

In the example illustrated in FIG. 6, in the case of (a), such a situation occurs until a data transmission period T12 starts after a data transmission period T02 ends, until a data transmission period T32 starts after a data transmission period T22 ends, until a data transmission period T14 starts after a data transmission period T04 ends, and until a data transmission period T34 starts after a data transmission period T24 ends. A total processing time required for a case in which three commands are transmitted to each of the memory chips MC0 to MC3 is 1,560 µs.

Thereafter, (b) a case in which the order of queues in which a command becomes a transmission target is caused to correspond to an order of lowest to highest command processing speed, in other words, a case in which program commands are transmitted to corresponding memory chips MC3, MC1, MC0, and MC2 in order of queues Q3, Q1, Q0, and Q2 will be described. In this case, a situation in which corresponding memory chips MC0 to MC3 are in the busy state when the queues Q0 to Q3 are in sequence for transmission of a new command can be prevented or reduced.

In the example illustrated in FIG. 6, in the case of (b), when the queues Q1, Q0, and Q2 are in sequence for transmission of a new command, memory chips MC1, MC0, and MC2 corresponding thereto are not in the busy state, and accordingly, new commands can be transmitted from the queues Q1, Q0, and Q2 to the corresponding memory chips MC1, MC0, and MC2 without any delay. Accordingly, a total processing time required for a case in which three commands are transmitted to each of the memory chips MC0 to MC3 is 1,440 µs.

Thus, as illustrated in FIG. 6, in a case where the order of queues in which a command becomes a transmission target is changed to correspond to an order of lowest to highest command processing speed, the whole processing time for transmitting the commands from the queues Q0 to Q3 to the memory chips MC0 to MC3 and executing the commands can be shortened by 120 µs.

Furthermore, instead of the command processing speed described above, a command transmission speed based on the number of commands transmitted from each queue to a corresponding memory chip within a unit period may be used. The command transmission speed of each of the queues Q0 to Q3, for example, may be determined based on the number of commands transmitted within a unit period that are counted for each of the queues Q0 to Q3. In addition, the command transmission speed of each of the queues Q0 to Q3 may be determined based on at least one of the number of positions at which transmission of a command is started (process start positions) within a unit period and the number of positions at which execution of a command using a memory chip ends (process end position) that are counted for each of the queues Q0 to Q3.

Figure 7:
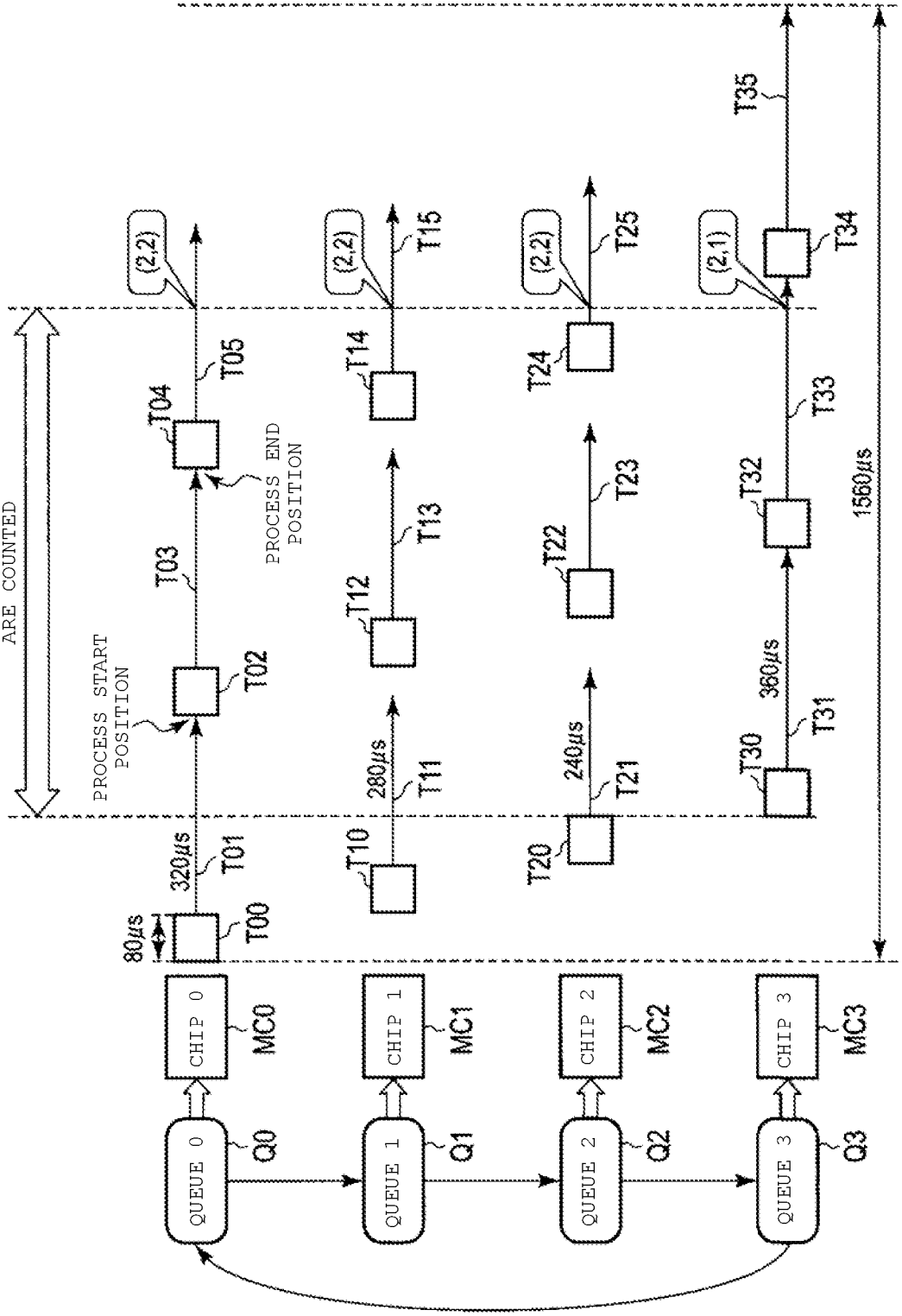
FIG. 7 is a diagram illustrating a first example in which the number of process start positions and the number of process end positions for commands within a unit period are counted by the memory system.

FIG. 7 illustrates an example in which process start positions and process end positions of commands within a unit period are counted for each of the queues Q0 to Q3. Here, it is assumed that a data transmission period in which data according to a command is transmitted to the memory chips MC0 to MC3 is 80 µs which is constant, a program time (chip busy period) using the memory chip MC0 is 320 µs, a program time using the memory chip MC1 is 280 µs, a program time using the memory chip MC2 is 240 µs, and a program time using the memory chip MC3 is 360 µs. In the example illustrated in FIG. 7, similar to the case of (a) described above with reference to FIG. 6, since the memory chip MC3 having a low command execution speed is in the busy state, even when a corresponding queue Q3 is in sequence for transmission of a new command, a situation in which a new command cannot be transmitted from the queue Q3 to the memory chip MC3 occurs.

The queue monitoring unit 424, within a unit period, for example, counts a time point at which transmission of data from a queue to a memory chip is started (for example, a start position of a data transmission period T02) as a process start position of a command and counts a time point at which execution of the command using the memory chip is completed (for example, an end position of the chip busy period T03) as a process end position. A time point at which execution of the command using the memory chip is completed, for example, is a time point at which there is a response of execution completion from the memory chip or a time point at which the memory chip is returned from the busy state to a ready state.

The queue monitoring unit 424, for example, for the queue Q0, counts start positions of data transmission periods T02 and T04 included in the unit period as two command process start positions and counts end positions of program times T01 and T03 as two command process end positions. In FIG. 7, the number of process start positions and the number of process end positions within the unit period of the queue Q0 are represented as (2, 2).

Similarly, for each of queues Q1 and Q2, two command process start positions and two command process end positions (in other words, (2, 2)) are counted. In addition, for the queue Q3, start positions of data transmission periods T30 and T32 included in the unit period are counted as two command process start positions, and an end position of the program time T31 is counted as one command process end position. In FIG. 7, the number of process start positions and the number of a process end position within the unit period of the queue Q3 are represented as (2, 1).

The arbiter 422 determines whether or not the arbitration rule 422A needs to be changed using at least one of the number of command process start positions and the number of command process end positions, which are counted, for each queue and changes the arbitration rule 422A when necessary.

More specifically, the arbiter 422 replaces an order of queues in which a command becomes a transmission target with an order of smallest to largest number of counted command process start positions, an order of smallest to largest counted command process end positions, or an order of smallest to largest number of a sum of command process start positions and command process end positions that are counted. In the example illustrated in FIG. 7, the arbiter 422 changes the arbitration rule 422A such that the queue Q3 having the smallest number (=1) of counted command process end positions is the first in the order in which a command becomes a transmission target. The arbitration rule 422A after the change, for example, represents that commands are respectively transmitted to corresponding memory chips MC3, MC0, MC1, and MC2 in the order of queues Q3, Q0, Q1, and Q2. The order of the queues Q3, Q0, Q1, and Q2 corresponds to an order of longest to shortest command processing time, in other words, an order of lowest to highest command processing speed.

Figure 8:
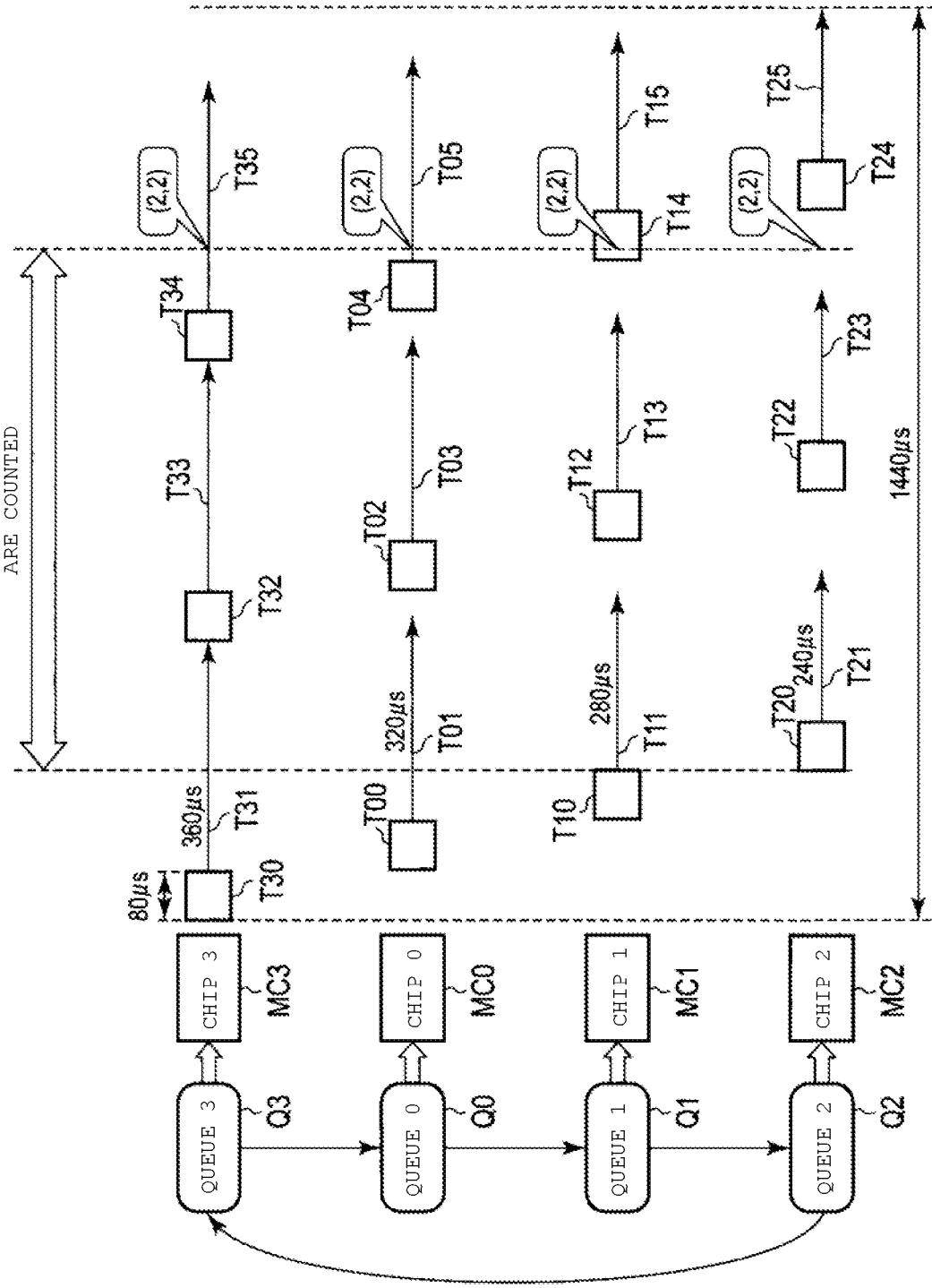
FIG. 8 is a diagram illustrating an example in which commands are transmitted in an ordering starting with a queue having a lowest number of process end positions of commands.

FIG. 8 illustrates an example in which commands are transmitted based on the arbitration rule 422A after the change. In the example illustrated in FIG. 8, when queues Q0, Q1, and Q2 are in sequence for transmission of new commands, memory chips MC0, MC1, and MC2 corresponding thereto are not in the busy state, and accordingly, new commands can be instantly transmitted from the queues Q0, Q1, and Q2 to the corresponding memory chips MC0, MC1, and MC2. In other words, until a data transmission period for a memory chip corresponding to a next queue is started after completion of a data transmission period for a memory chip corresponding to a certain queue, a delay time does not occur. In such a configuration, a total processing time required for a case in which three commands are transmitted to each of the memory chips MC0 to MC3 is 1,440 µs.

Thus, when comparing the example illustrated in FIG. 7 with the example illustrated in FIG. 8, in a case where the order of queues in which a command becomes a transmission target is changed to correspond to an order of smallest to largest number of command process end positions counted within the unit period, a total processing time of a plurality of the memory chips MC0 to MC3 can be shortened by 120 µs.

Furthermore, in the example illustrated in FIG. 8, in the unit period, the numbers of command process start positions of the queues Q0 to Q3 are all the same, and the numbers of command process end positions thereof are all the same ((2, 2)). Accordingly, the arbitration rule 422A is not changed.

Figure 9:
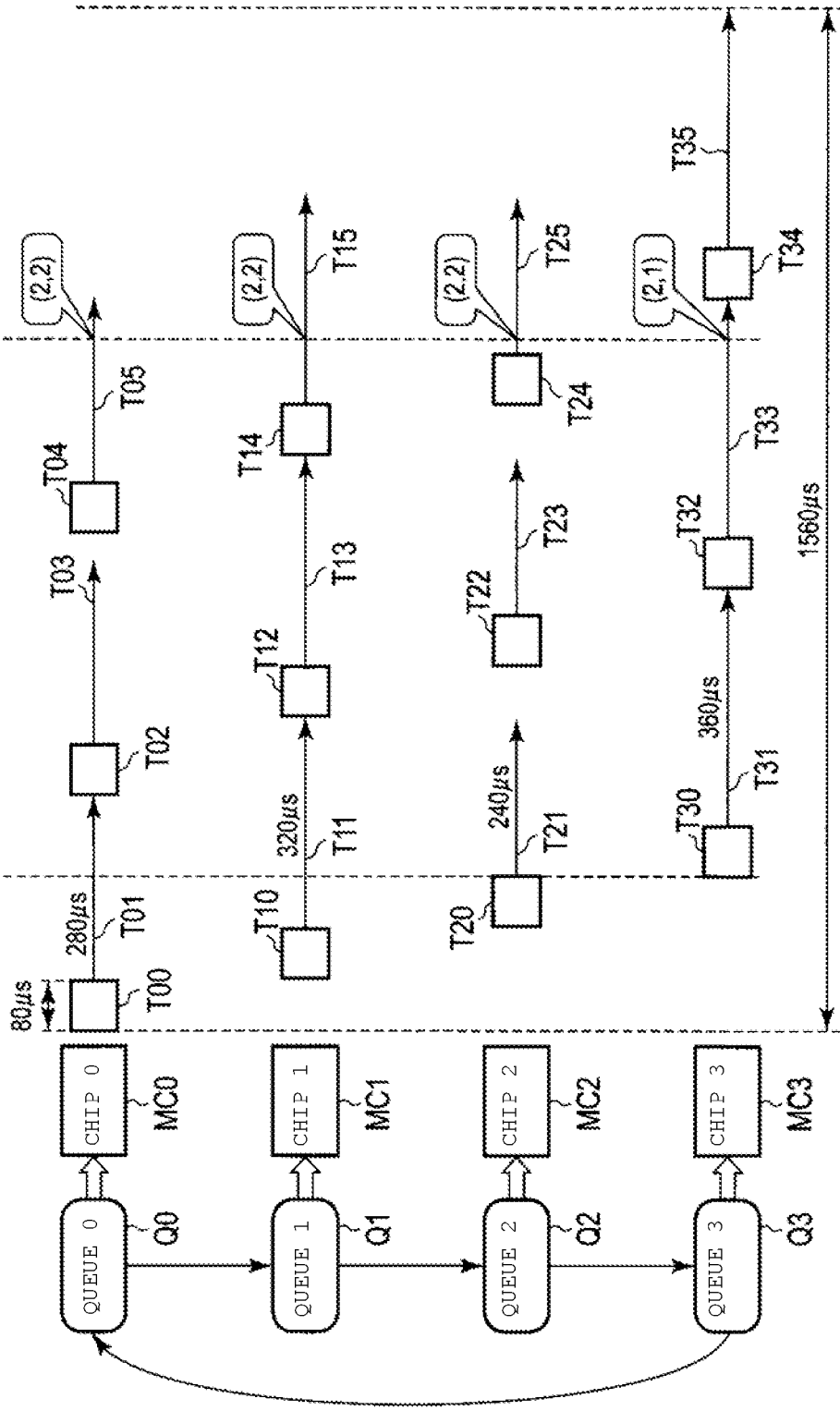
FIG. 9 is a diagram illustrating a second example in which the number of process start positions and the number of process end positions of commands within a unit period are counted by the memory system.

Next, FIG. 9 illustrates a case in which program times of memory chips MC0 to MC3 are different from those of the examples illustrated in FIGS. 7 and 8. In the example illustrated in FIG. 9, it is assumed that a data transmission period in which data according to a command is transmitted to the memory chips MC0 to MC3 is 80 µs which is constant, a program time (chip busy period) using the memory chip MC0 is 280 µs, a program time using the memory chip MC1 is 320 µs, a program time using the memory chip MC2 is 240 µs, and a program time using the memory chip MC3 is 360 µs. In this case, even when corresponding queues Q1 and Q3 are in sequence for transmission of new commands, memory chips MC1 and MC3 having low command execution speeds are in the busy state, and accordingly, a situation occurs in which a new command cannot be transmitted from the queues Q1 and Q3 to the memory chips MC1 and MC3.

The queue monitoring unit 424, for a queue Q0, counts start positions of data transmission periods T02 and T04 included in the unit period as two command process start positions and counts end positions of program times T01 and T03 as two command process end positions. In FIG. 9, the number of process start positions and the number of process end positions within the unit period of the queue Q0 are represented as (2, 2).

Similarly, for each queues Q1 and Q2, two command process start positions and two command process end positions (in other words, (2, 2)) are counted. In addition, for a queue Q3, start positions of data transmission periods T30 and T32 included in the unit period are counted as two command process start positions, and an end position of a program time T31 is counted as one command process end position. In FIG. 9, the number of process start positions and the number of process end positions within the unit period of the queue Q3 are represented as (2, 1).

The arbiter 422 determines whether or not the arbitration rule 422A needs to be changed using at least one of the number of command process start positions and the number of command process end positions, which are counted, for each queue and changes the arbitration rule 422A when necessary.

More specifically, the arbiter 422 replaces an order of queues in which a command becomes a transmission target with an order of smallest to largest number of counted command process start positions, an order of smallest to largest counted command process end positions, or an order of smallest to largest number of a sum of command process start positions and command process end positions that are counted. In the example illustrated in FIG. 9, the arbiter 422 changes the arbitration rule 422A such that the queue Q3 having the smallest number (=1) of counted command process end positions is the first in the order in which a command becomes a transmission target. The arbitration rule 422A after the change, for example, represents that commands are respectively transmitted to corresponding memory chips MC3, MC0, MC1, and MC2 in the order of queues Q3, Q0, Q1, and Q2.

Figure 10:
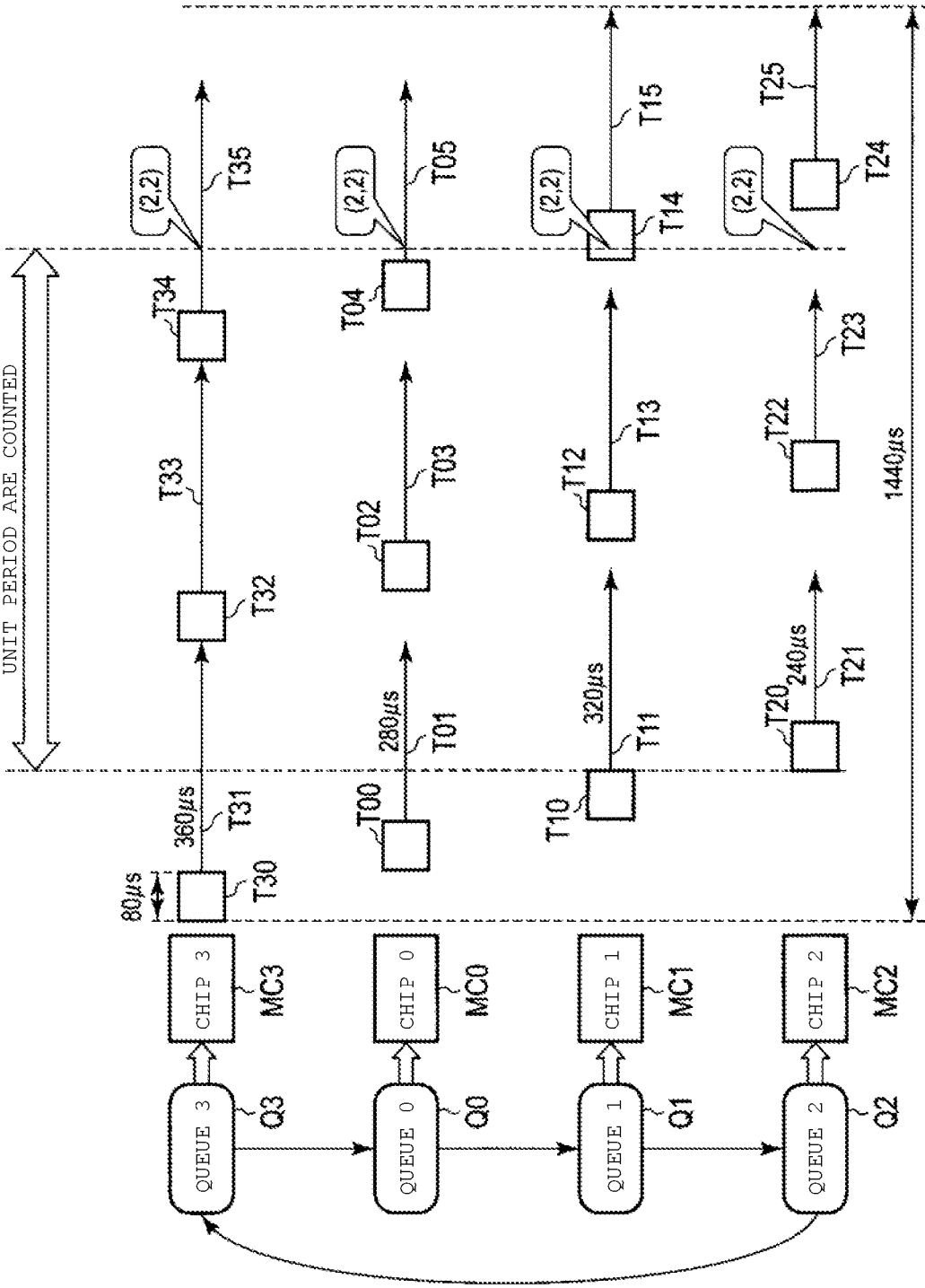
FIG. 10 is a diagram illustrating an example in which commands are transmitted in an ordering starting with a queue having a lowest number of process end positions.

FIG. 10 illustrates an example in which commands are transmitted based on the arbitration rule 422A after the change. In the example illustrated in FIG. 10, when queues Q0, Q1, and Q2 are in sequence for transmission of new commands, memory chips MC0, MC1, and MC2 corresponding thereto are not in the busy state, and accordingly, new commands can be instantly transmitted from the queues Q0, Q1, and Q2 to the corresponding memory chips MC0, MC1, and MC2. In other words, until a data transmission period for a memory chip corresponding to a next queue is started after completion of a data transmission period for a memory chip corresponding to a certain queue, a delay time does not occur. In such a configuration, a total processing time required for a case in which three commands are transmitted to each of the memory chips MC0 to MC3 is 1,440 μs.

Thus, when comparing the example illustrated in FIG. 9 with the example illustrated in FIG. 10, in a case where the order of queues in which a command becomes a transmission target is changed to correspond to an order of smallest to largest number of command process end positions counted within the unit period, a total processing time for transmitting commands from the queues Q0 to Q3 to the memory chips MC0 to MC3 and executing the commands can be shortened by 120 μs.

Furthermore, in the example illustrated in FIG. 10, the order of queues Q3, 40, Q1, and Q2 represented in the arbitration rule 422A after the change does not partly correspond to an order of longest to smallest command processing time (an order of queues Q3, Q1, Q0, and Q2). However, a total processing time for transmitting commands from the queues Q0 to Q3 to the memory chips MC0 to MC3 and executing the commands is shortened as in the example illustrated in FIG. 8 in which the order of queues represented in the arbitration rule 422A after the change coincides with the order of longest to shortest command processing time. In this way, depending on the relation of command processing times, there are cases in which a similar shortening effect can be acquired without necessarily causing the order of the queues Q0 to Q3 to completely correspond to an order of longest to shortest command processing time.

In addition, in the example illustrated in FIG. 10, the numbers of command process start positions of the queues Q0 to Q3 are all the same, and the numbers of command process end positions thereof are all the same ((2, 2)). Accordingly, the arbitration rule 422A is not changed.

Next, the operation of the flash controller engine 13 will be described with reference to FIGS. 11 to 14. Here, while the operation in a channel CH0 will be described as an example, operations in the other channels are similar thereto.

Figure 11:
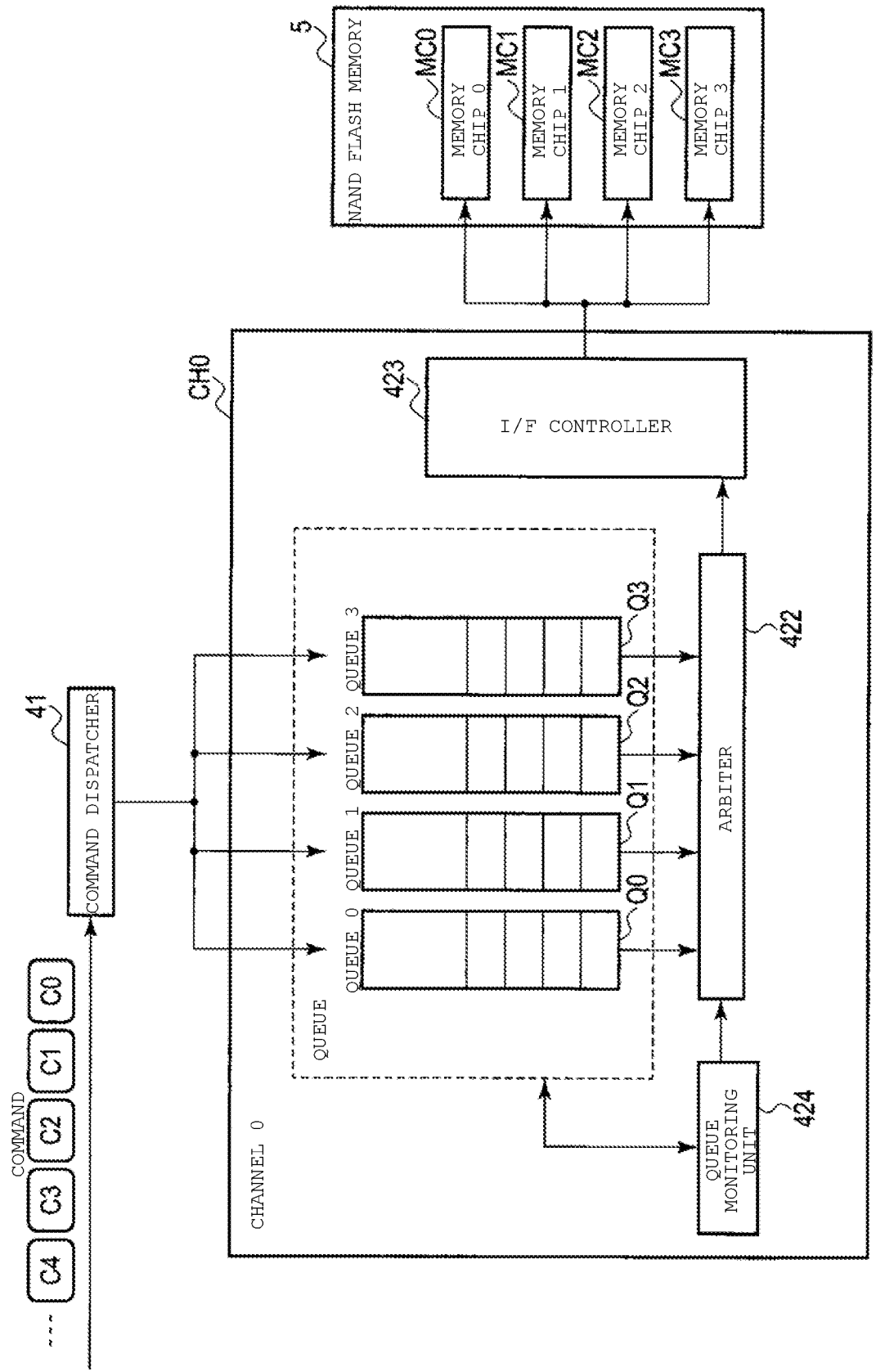
FIG. 11 is a diagram illustrating an example in which a flash controller engine receives a plurality of commands.

As illustrated in FIGS. 11, the command dispatcher 41 receives commands C0 to C4 sent by the command control unit 21 (CPU 12). As described above, the commands C0 to C4 are commands, which are executed by the memory chips MC0 to MC3, generated by processing various commands (for example, a write command, a read command, and the like) received from the host 2 or by operations inside the SSD 3 such as a garbage collection operation.

Each of the commands C0 to C4 received by the command dispatcher 41, for example, is one of a program command, a read command, and an erase command. In the program command, a physical address (for example, a chip, a block, and a page) at which data is to be written is designated. In the read command, a physical address from which data is to be read is designated. In addition, in the erase command, a physical address from which data is to be erased is designated.

In the commands C0 to C4 received by the command dispatcher 41, for example, a program command for sequential write may be also included. In addition, in the commands C0 to C4, various kinds of commands may be mixed.

The command dispatcher 41 distributes the commands C0 to C4 to the queues Q0 to Q3 based on physical addresses designated by the commands C0 to C4. More specifically, the command dispatcher 41 specifies a memory chip including a physical storage position represented by the designated physical address from among the memory chips MC0 to MC3. Then, the command dispatcher 41 stores (accumulates) the command in a queue corresponding to the specified memory chip among the queues Q0 to Q3.

For example, in a case where a command designating a physical address inside the memory chip MC0 is received, the command dispatcher 41 stores the command in the queue Q0 corresponding to the memory chip MC0. Ina case where a command designating a physical address inside the memory chip MC1 is received, the command dispatcher 41 stores the command in the queue Q1 corresponding to the memory chip MC1. In a case where a command designating a physical address inside the memory chip MC2 is received, the command dispatcher 41 stores the command in the queue Q2 corresponding to the memory chip MC2. In addition, in a case where a command designating a physical address inside the memory chip MC3 is received, the command dispatcher 41 stores the command in the queue Q3 corresponding to the memory chip MC3.

Figure 12:
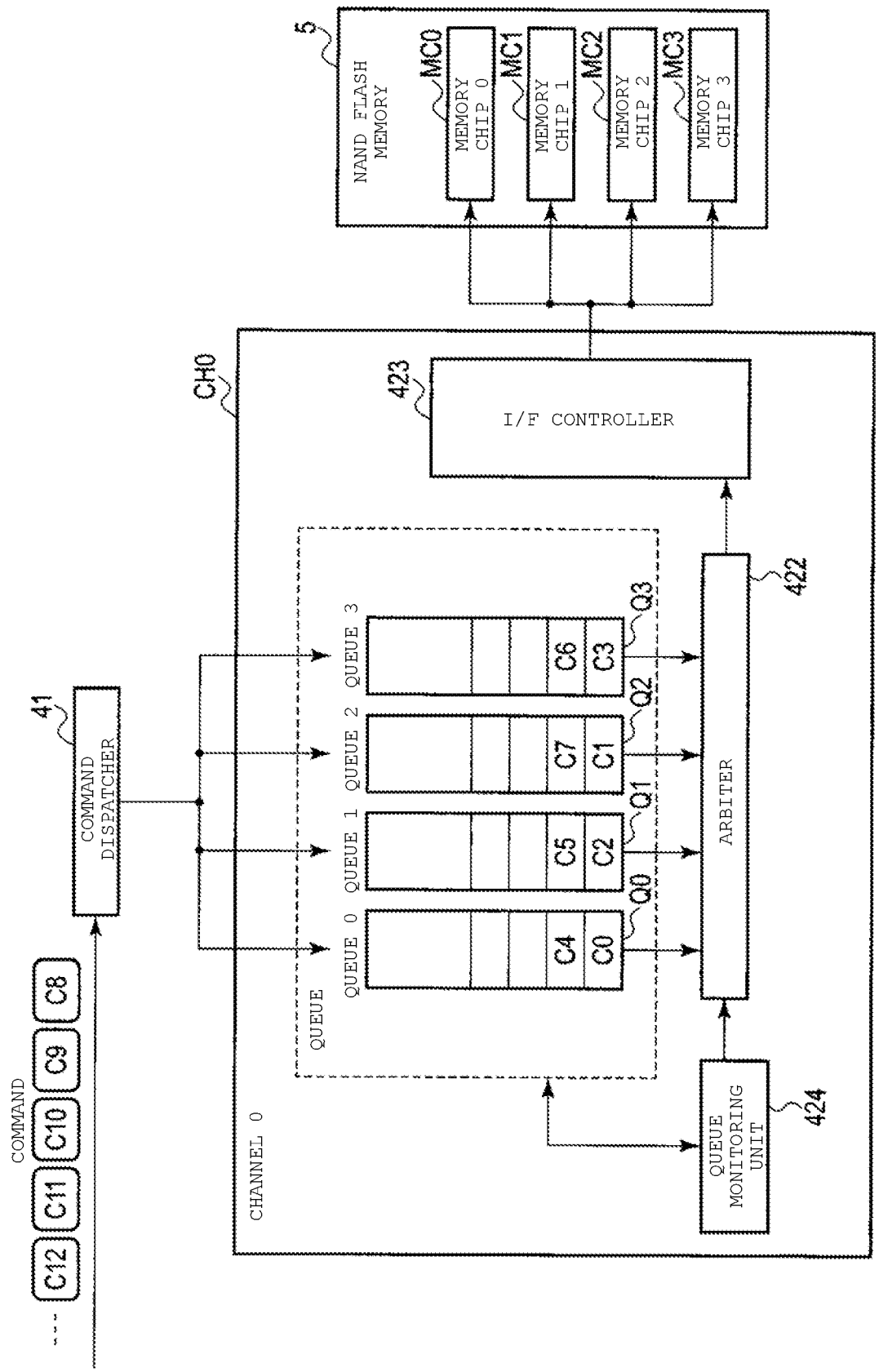
FIG. 12 is a diagram illustrating an example in which a plurality of commands is stored in queues.

FIG. 12 illustrates an example in which commands are stored in queues Q0 to Q3 in accordance with distribution using the command dispatcher 41. Here, commands C0 and C4 are stored in the queue Q0, commands C2 and C5 are stored in the queue Q1, commands C1 and C7 are stored in the queue Q2, and commands C3 and C6 are stored in the queue Q3. Accordingly, the commands C0 and C4 are commands transmitted to a memory chip MC0 corresponding to the queue Q0, the commands C2 and C5 are commands transmitted to a memory chip MC1 corresponding to the queue Q1, the commands C1 and C7 are commands transmitted to a memory chip MC2 corresponding to the queue Q2, and the commands C3 and C6 are commands transmitted to a memory chip MC3 corresponding to the queue Q3.

The arbiter 422 acquires the commands stored in the queues Q0 to Q3 in accordance with the arbitration rule 422A and causes the memory chips MC0 to MC3 to execute processes according to the acquired commands. In the example illustrated in FIG. 13, the arbitration rule 422A represents that the order of queues in which a command becomes a transmission target is an order of queues Q0, Q1, Q2, and Q3.

Figure 13:
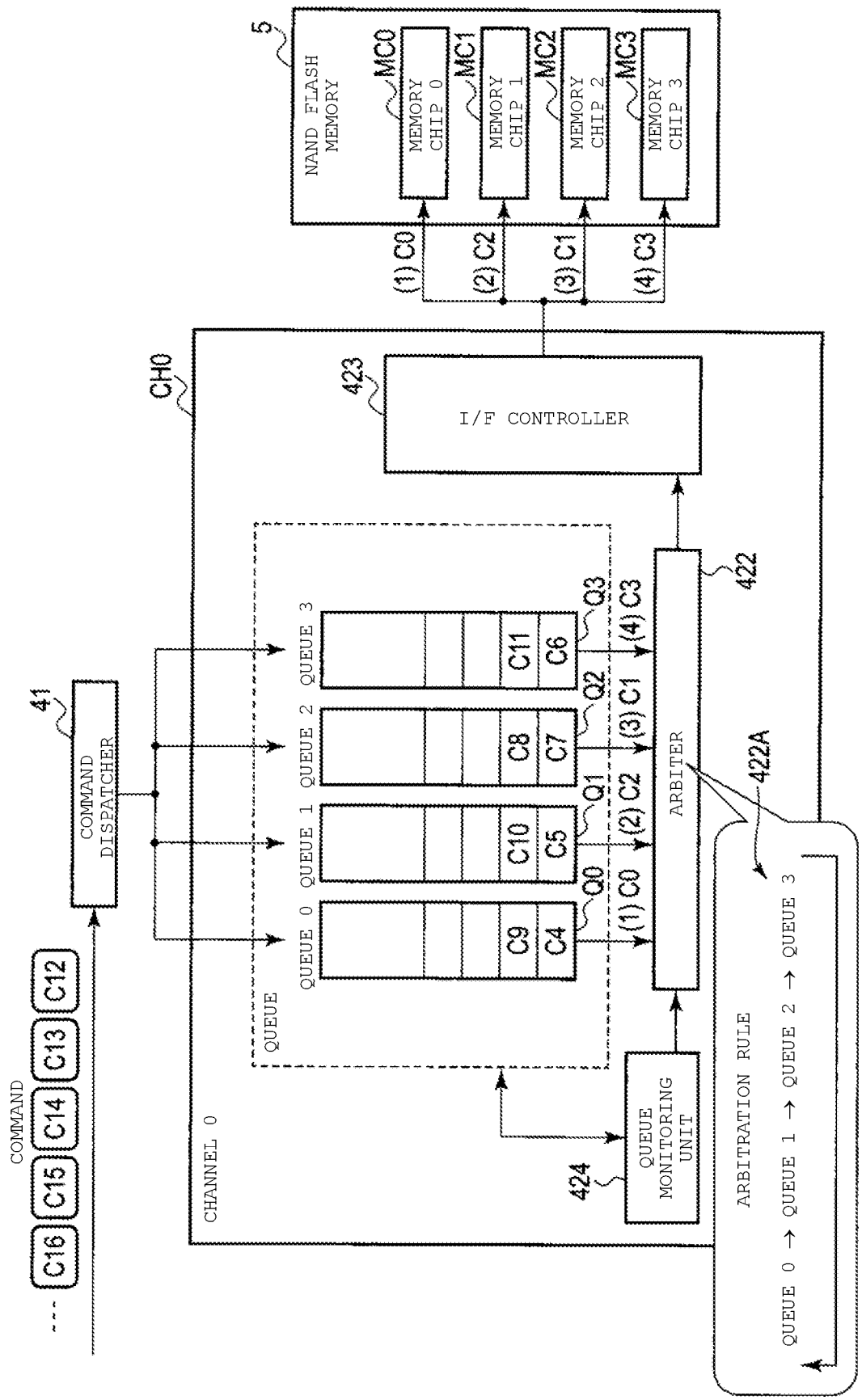
FIG. 13 is a diagram illustrating an example in which commands stored in the queues are transmitted in an order based on an arbitration rule.

As illustrated in FIG. 13, the arbiter 422 operates as below in accordance with the arbitration rule 422A.

(1) The command C0 is acquired from the queue Q0, and the command C0 is transmitted to the corresponding memory chip MC0 (the memory chip MC0 is caused to execute a process according to the command C0).

(2) The command C2 is acquired from the queue Q1, and the command C2 is transmitted to the corresponding memory chip MC1 (the memory chip MC1 is caused to execute a process according to the command C2).

(3) The command C1 is acquired from the queue Q2, and the command C2 is transmitted to the corresponding memory chip MC2 (the memory chip MC2 is caused to execute a process according to the command C1).

(4) The command C3 is acquired from the queue Q3, and the command C3 is transmitted to the corresponding memory chip MC3 (the memory chip MC3 is caused to execute a process according to the command C3).

In addition, by monitoring the operation described above, the queue monitoring unit 424 acquires a command transmission speed of each queue or a command processing speed of each of a plurality of sets of an associated queue and a memory chip. The command transmission speed, as described above, for example, is acquired by counting at least one of the number of process start positions and the number of process end positions of commands within a unit period for each queue. In addition, the command processing speed is acquired based on an elapsed time from a process start position to a process end position of a command.

Figure 14:
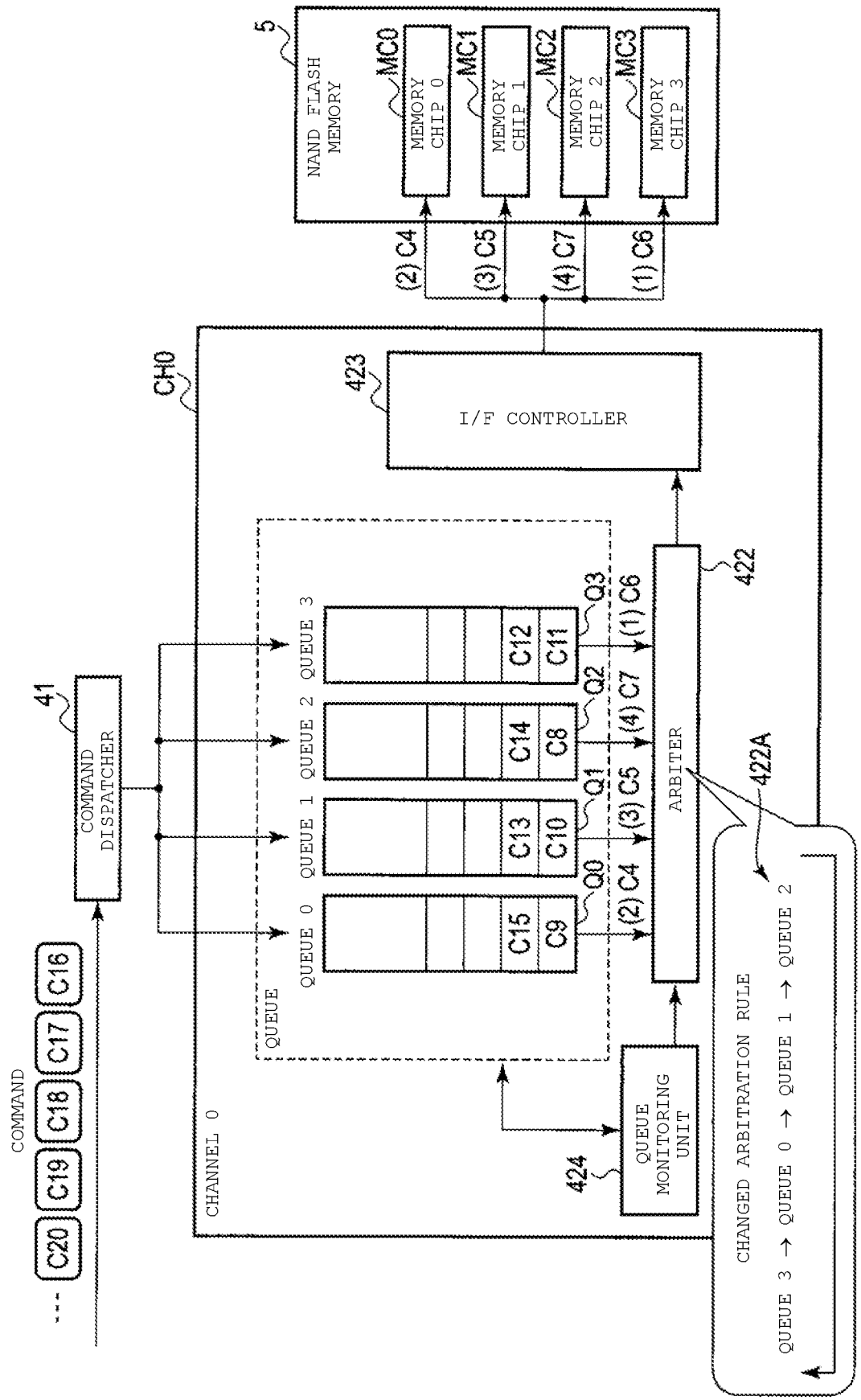
FIG. 14 is a diagram illustrating an example in which commands stored in the queues are transmitted in an order based on an arbitration rule set in accordance with a command transmission speed of a queue.

In a case where the command transmission speed or the command processing speed that is acquired, for example, represents being lower in the order of queues Q3, Q0, Q1, and Q2, the arbiter 422 changes the arbitration rule 422A such that the order of queues in which a command becomes a transmission target corresponds to the order of lowest to highest command transmission speed or command processing speed. Accordingly, as illustrated in FIG. 14, the arbitration rule 422A after the change represents that the order of queues in which a command becomes a transmission target is an order of queues Q3, Q0, Q1, and Q2.

Then, the arbiter 422 acquires commands stored in the queues Q0 to Q3 in accordance with the arbitration rule 422A after the change and causes the memory chips MC0 to MC3 to execute processes according to the acquired commands. As illustrated in FIG. 14, the arbiter 422 operates as below in accordance with the arbitration rule 422A.

(1) A command C6 is acquired from the queue Q3, and the command C6 is transmitted to a corresponding memory chip MC3 (the memory chip MC3 is caused to execute a process according to the command C6).

(2) A command C4 is acquired from the queue Q0, and the command C4 is transmitted to a corresponding memory chip MC0 (the memory chip MC0 is caused to execute a process according to the command C4).

(3) A command C5 is acquired from the queue Q1, and the command C5 is transmitted to a corresponding memory chip MC1 (the memory chip MC1 is caused to execute a process according to the command C5).

(4) A command C7 is acquired from the queue Q2, and the command C7 is transmitted to a corresponding memory chip MC2 (the memory chip MC2 is caused to execute a process according to the command C7).

In this way, the order of queues in which a command becomes a transmission target is dynamically changed to correspond to an order of lowest to highest command transmission speed or command processing speed. Accordingly, for example, since a command is transmitted first to a memory chip having a lower command execution speed, a total processing time for transmitting commands from the queues Q0 to Q3 to the memory chips MC0 to MC3 and executing the commands can be shortened. Therefore, the access performance to the NAND flash memory 5 including the memory chips MC0 to MC3 can be improved.

Figure 15:
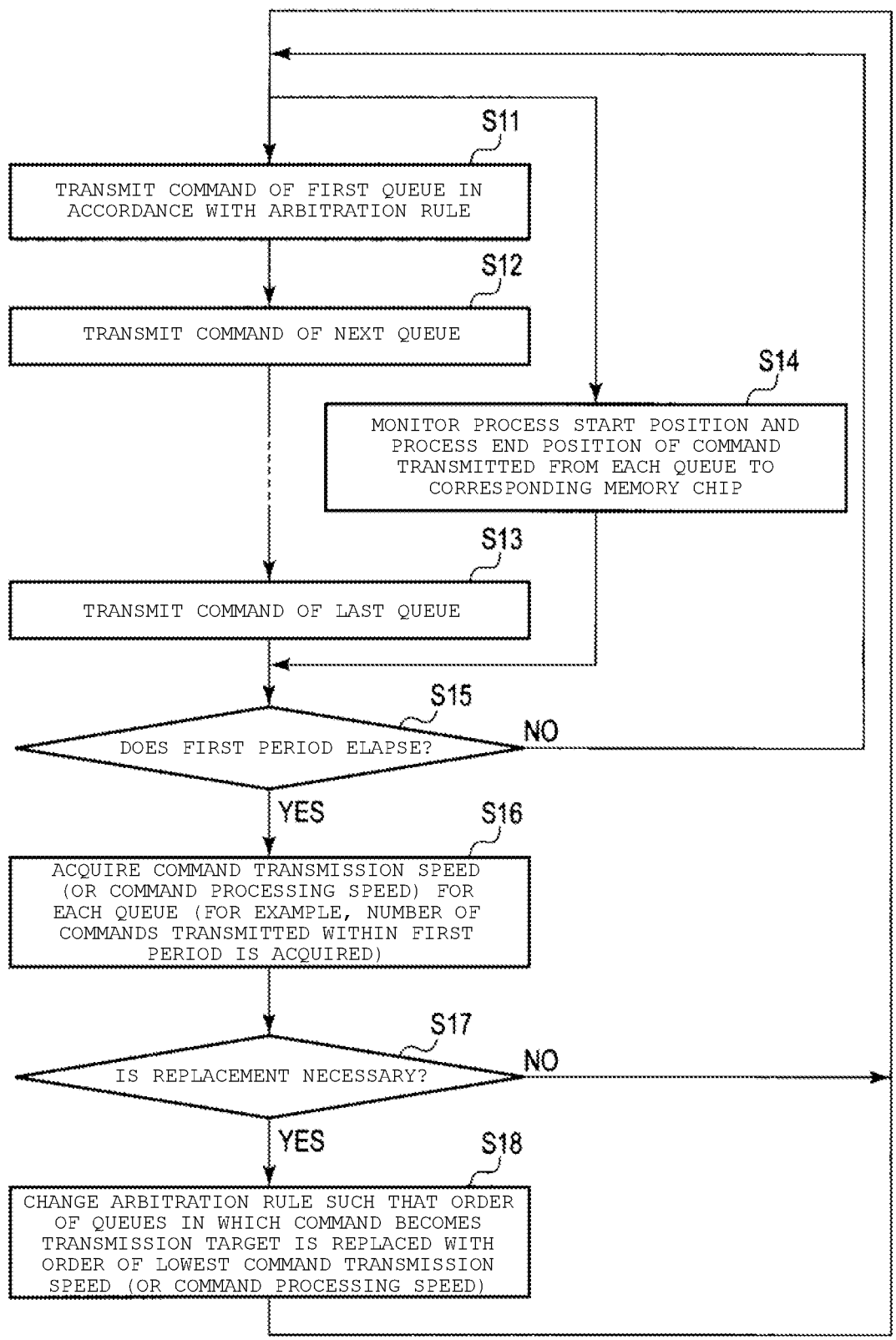
FIG. 15 is a flowchart illustrating a sequence of a command transmission control process executed by the memory system according to the first embodiment.

Next, an example of the sequence of a command transmission control process executed by the controller 4 will be described with reference to a flowchart illustrated in FIG. 15. Here, it is assumed that commands are already stored in queues Q0, Q1 . . . Qy−1.

First, each of the arbiters 422 and 432 transmits one of the commands stored in a first queue to a memory chip corresponding to the queue in accordance with the arbitration rule 422A or 432A (Step S11).

Then, each of the arbiters 422 and 432 transmits one of the commands stored in the next queue to a memory chip corresponding to the queue (Step S12). Similarly, each of the arbiters 422 and 432 transmits one of the commands stored in each queue to a corresponding memory chip in accordance with the order represented in the arbitration rule 422A or 432A, thereby sequentially transmitting the commands up to a queue of the last order (Step S13).

In addition, in parallel with the sequence of Steps S11 to S13, each of the queue monitoring units 424 and 434 monitors at least one of the process start position and the process end position of a command transmitted from each queue to a corresponding memory chip (Step S14). The queue monitoring units 424 and 434, for example, count at least one of the process start and end positions of a command for each queue. In addition, the queue monitoring units 424 and 434 may measure a time of the process start position and a time of a process end position or an elapsed time from the process start position to the process end position.

After Steps S13 and S14 are completed, the arbiters 422 and 432 determine whether or not a first period elapses (Step S15). The first period is a unit period in which a command transmission speed of each queue is measured. In a case where the first period did not elapse (No in Step S15), the process is returned to Steps S11 and S14, and the transmission of a command and the monitoring of at least one of the process start position and the process end position is continued.

When the first period elapsed (Yes in Step S15), the arbiters 422 and 432 acquire a command transmission speed within the first period for each queue (Step S16). The arbiters 422 and 432, for example, acquire the number of commands transmitted within the first period for each queue. The number of commands transmitted to memory chips within the first period, for example, is represented by at least one of the number of process start positions and the number of process end positions of commands that are counted within the first period in Step S14.

Thereafter, the arbiters 422 and 432 determine whether or not the order of queues in which a command becomes a transmission target needs to be replaced, in other words, whether or not the arbitration rules 422A and 432A need to be changed based on the acquired command transmission speed of each queue (Step S17). For example, in a case where the order of queues in which a command becomes a transmission target corresponds to an order of lowest to highest command transmission speed, the arbiters 422 and 432 determine that the order of the queues does not need to be replaced. On the other hand, in a case where the order of queues in which a command becomes a transmission target does not correspond to the order of lowest to highest command transmission speed, the arbiters 422 and 432 determine that the order of the queues needs to be replaced.

In a case where the order of queues does not need to be replaced (No in Step S17), the process is returned to Steps S11 and S14.

On the other hand, in a case where the order of the queues needs to be replaced (Yes in Step S17), the arbiters 422 and 432 change the arbitration rules 422A and 432A such that the order of the queues in which a command becomes a transmission target is replaced with the order of lowest to highest command transmission speed (Step S18), and the process is returned to Steps S11 and S14.

Furthermore, in the sequence of Step S16, the arbiters 422 and 432 may acquire a command processing speed of each queue (memory chip). The arbiters 422 and 432, for example, acquire a command processing speed of each queue based on the time of the process start position and the time of the process end position measured in Step S14 or an elapsed time from the process start position to the process end position. In this case, in the sequence of Steps S17 and S18, the command processing speed is used instead of the command transmission speed.

As above, the order of queues (arbitration rule) in which a command becomes a transmission target is dynamically changed such that commands are transmitted from queues to corresponding memory chips in order of lowest to highest command transmission speed or command processing speed of a plurality of queues corresponding to a plurality of memory chips connected to a certain channel. Accordingly, a delay occurring when commands are executed in parallel is decreased, and a total processing time for transmitting commands from a plurality of queues to a plurality of memory chips and executing the commands can be shortened. Therefore, access performance to the NAND flash memory 5 including a plurality of memory chips can be improved.

In addition, since the arbitration rules are dynamically changed, the command control unit 21 provided inside the firmware 20 can send a command to the flash controller engine 13 without considering the command transmission speed or the command processing speed of the queue. The sent command is stored in a queue corresponding to a memory chip in which the command is executed and can be transmitted to a memory chip corresponding to the order of lowest to highest command transmission speed or the command processing speed of the queue.

Furthermore, also in a case where a plurality of memory chips are associated with one queue, the arbiters 422 and 432 dynamically change the arbitration rules 422A and 432A such that, in a queue having a lower command transmission speed or a lower command processing speed, the order in which a command becomes a transmission target is earlier. Accordingly, also in a case where a plurality of memory chips are associated with one queue, similarly, access performance to the NAND flash memory 5 including the plurality of memory chips can be improved.

Second Embodiment

In the first embodiment, the queue monitoring units 424 and 434 for monitoring the command processing speed or the command transmission speed of each queue are provided in the flash controller engine 13. On the other hand, in a second embodiment, as illustrated in FIG. 16, a queue monitoring unit 22 is implemented as a part of the firmware 20 executed by the CPU 12.

The configuration of an SSD 3 according to the second embodiment is similar to that of the SSD 3 according to the first embodiment, and only the sequence of the processes using the CPU 12 functioning as the queue monitoring unit 22 by executing the firmware 20 and the sequence of the processes executed by the command dispatcher 41 and the arbiters 422 and 432 are different between the second embodiment and the first embodiment. Hereinafter, only aspects different from those of the first embodiment will be described.

Figure 16:
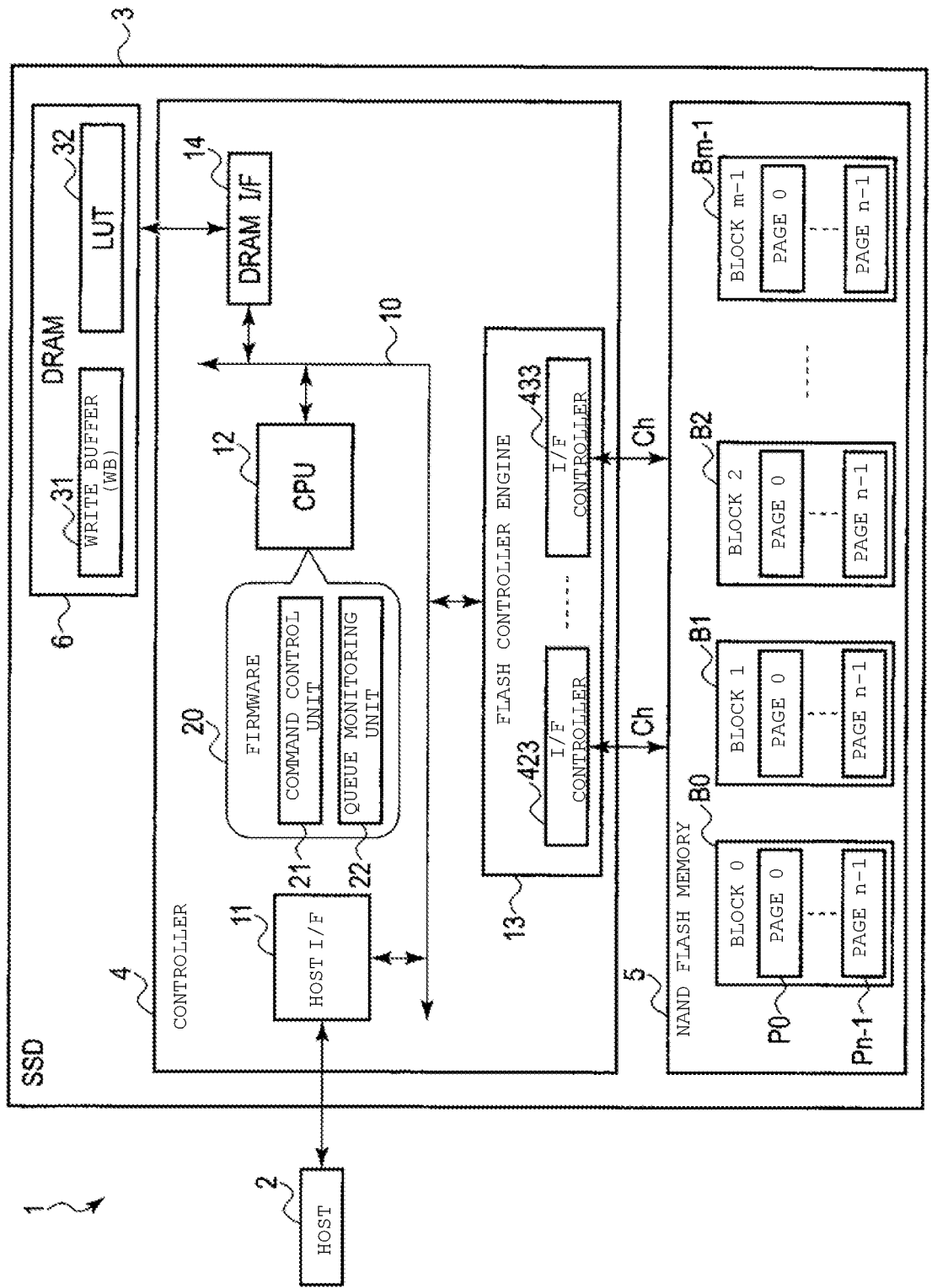
FIG. 16 is a block diagram illustrating an example of the configuration of a memory system according to a second embodiment.

As illustrated in FIG. 16, in addition to the command control unit 21, the queue monitoring unit 22 is further provided in the firmware 20. The queue monitoring unit 22, similar to the queue monitoring units 424 and 434 according to the first embodiment, monitors a command processing speed of each of a plurality of sets of a queue and a memory chip or a command transmission speed of each queue.

More specifically, the queue monitoring unit 22 detects a process start position and a process end position of a command, for example, by receiving a signal (data) representing a time point at which transmission of the command from a queue to a corresponding memory chip is started or a signal representing a time point at which execution of the command using a memory chip ends from a flash controller engine 13, reading a register representing the state of a queue or a memory chip, or the like. The queue monitoring unit 22 can calculate a command processing speed of each set of a queue and a memory chip based on an elapsed time from the process start position to the process end position that are detected.

In addition, the queue monitoring unit 22 may count at least one of the number of processing start positions and the number of process end positions of commands for each queue. The queue monitoring unit 22 can acquire a command transmission speed of each queue by using at least one of the number of process start positions and the number of process end positions of commands that are counted.

Figure 17:
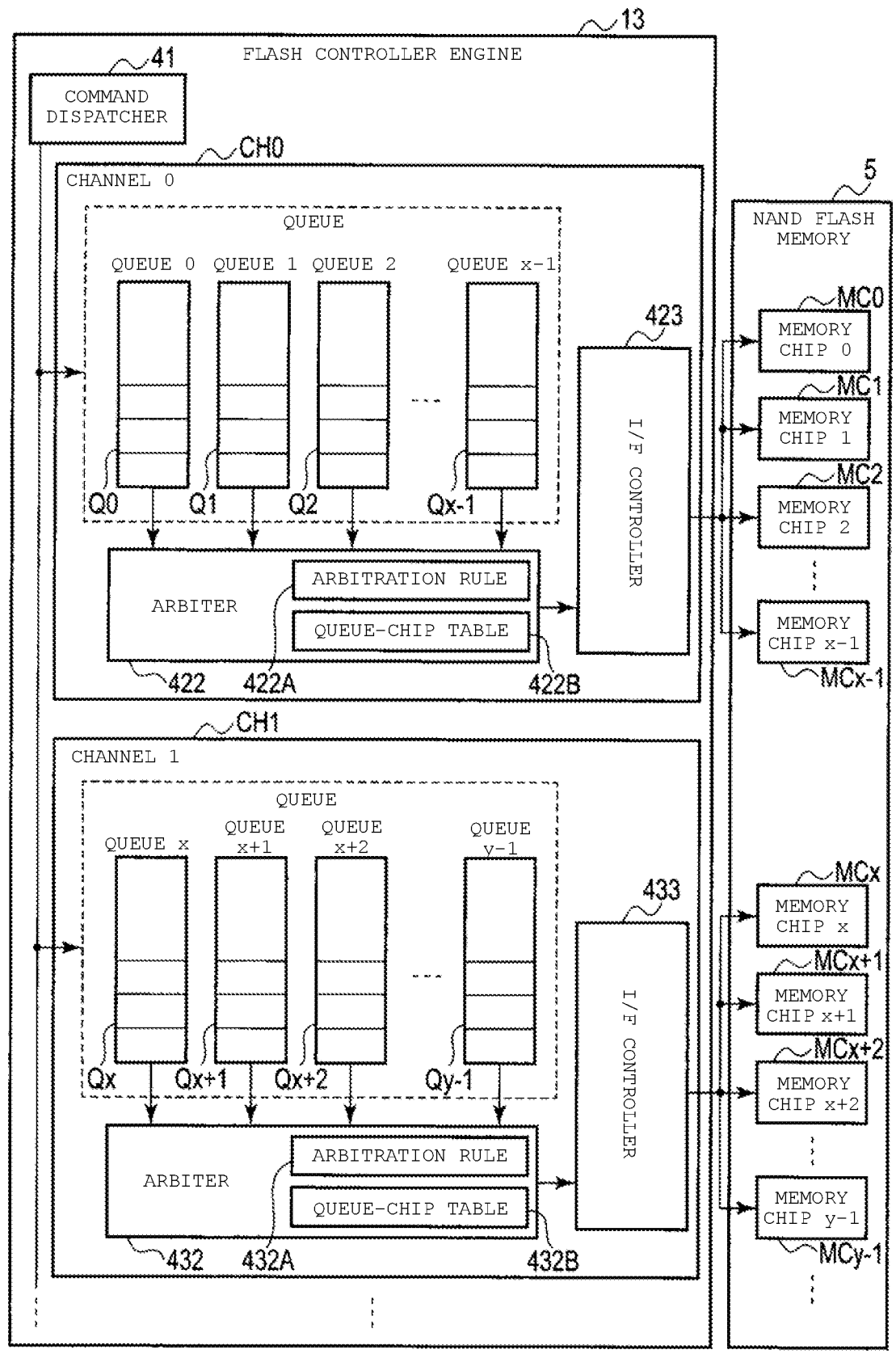
FIG. 17 is a block diagram illustrating a configuration of a flash controller engine and a plurality of NAND flash memory chips inside a memory system according to the second embodiment.

In addition, as illustrated in FIG. 17, arbiters 422 and 432 manage not only arbitration rules 422A and 432A but also queue-chip tables 422B and 432B. The queue-chip tables 422B and 432B represent correspondence relations between queues and memory chips. For example, in the queue-chip table 422B, it is represented that a plurality of memory chips MC0, MC1, MC2 . . . MCx−1 correspond to a plurality of queues Q0, Q1, Q2 . . . Qx−1, respectively. In addition, in the queue-chip table 432B, it is represented that a plurality of memory chips MCx, MCx+1, MCx+2 . . . MCy−1 correspond to a plurality of queues Qx, Qx+1, Qx+2 . . . Qy−1, respectively.

A command dispatcher 41 receives commands sent to the flash controller engine 13 using a CPU 12 (command control unit 21) and distributes each of the commands to one of the queues Q0, Q1 . . . Qy−1. As described above, a command, for example, is one of a program command, a read command, and an erase command. In the program command, a physical address (for example, a chip, a block, and a page) at which data is to be written is designated. In the read command, a physical address from which data is to be read is designated. In addition, in the erase command, a physical address from which data is to be erased is designated.

The command dispatcher 41 distributes each command to one of queues Q0, Q1 . . . Qy−1 based on a physical address designated by the command. More specifically, the command dispatcher 41 specifies a memory chip including a physical storage position represented by the designated physical address from among a plurality of memory chips MC0, MC1 . . . MCy−1 inside a NAND flash memory 5. Then, the command dispatcher 41 sends a command to a queue corresponding to the specified memory chip among the queues Q0, Q1 . . . Qy−1 in accordance with the queue-chip tables 422B and 432B. Accordingly, the command is stored in the queue corresponding to the memory chip to be accessed in accordance with the command.

The arbiters 422 and 432 acquire one of commands stored in the queue in which a command is a transmission target in accordance with the sequence represented in the arbitration rules 422A and 432A. Then, the arbiters 422 and 432 cause the memory chip specified based on the physical address designated by the command to execute a process according to the command.

In addition, the arbiters 422 and 432 may change the queue-chip tables 422B and 432B based on the command processing speed or the command transmission speed acquired by the queue monitoring unit 22 such that a queue, in which the order in which a command becomes a transmission target, represented by the arbitration rules 422A and 432A is earlier, is associated with a memory chip associated with a queue having a lower command processing speed or command transmission speed. The arbiters 422 and 432 may be configured to change the queue-chip tables 422B and 432B and not to change the arbitration rules 422A and 432A based on the command processing speed or the command transmission speed of each queue. In other words, the order of queues in which a command becomes a transmission target may be fixed.

For example, a case will be assumed in which a first memory chip and a second memory chip are included in a plurality of memory chips that are connected to a channel CH0 and can execute a parallel operation. In addition, the channel CH0 includes a first queue and a second queue that becomes a target for command transmission after the first queue. In this case, the arbiter 422 changes the queue-chip table 422B as below. In other words, (1) in a case where a first command processing speed based on a time until execution of a command using the first memory chip is completed after transmission of the command to the first memory chip is started is lower than a second command processing speed based on a time until execution of a command using the second memory chip is completed after transmission of the command to the second memory chip is started, the arbiter 422 associates the first memory chip with the first queue and associates the second memory chip with the second queue. In addition, (2) in a case where the second command processing speed is lower than the first command processing speed, the arbiter 422 associates the second memory chip with the first queue and associates the first memory chip with the second queue.

In accordance with a command received from the host 2 or the like, the command control unit 21 generates a first command to be executed by a memory chip associated with the first queue and a second command to be executed by a memory chip associated with the second queue and sends the generated first and second commands to the flash controller engine 13. The command dispatcher 41 stores the first command in the first queue and stores the second command in the second queue. Then, in accordance with the arbitration rule 422A, the arbiter 422 acquires the first command from the first queue, transmits the acquired first command to a memory chip associated with the first queue, thereafter acquires the second command from the second queue, and transmits the acquired second command to a memory chip associated with the second queue.

These first command processing speed and second command processing speed may be measured when a third command to be executed by the first memory chip and a fourth command to be executed by the second memory chip are processed. Here, it is assumed that the first queue is associated with the first memory chip, and the second queue is associated with the second memory chip.

The command dispatcher 41 stores the third command in the first queue and stores the fourth command in the second queue. The queue monitoring unit 22 acquires the third command from the first queue and measures a first command processing speed based on a time until execution of the third command using the first memory chip is completed after transmission of the acquired third command to the first memory chip. In addition, the queue monitoring unit 22 acquires the fourth command from the second queue and measures a second command processing speed based on a time until execution of the fourth command using the second memory chip is completed after transmission of the acquired fourth command to the second memory chip.

Alternatively, the arbiter 422 may change the queue-chip table 422B as below. In other words, (1) in a case where the first command transmission speed based on the number of commands transmitted to the first memory chip in a first period is lower than the second command transmission speed based on the number of commands transmitted to the second memory chip in the first period, the arbiter 422 associates the first memory chip with the first queue and associates the second memory chip with the second queue. On the other hand, (2) in a case where the second command transmission speed is lower than the first command transmission speed, the arbiter 422 associates the second memory chip with the first queue and associates the first memory chip with the second queue.

These first command transmission speed and second command transmission speed may be measured when a plurality of third commands to be executed by the first memory chip and a plurality of fourth commands to be executed by the second memory chip are processed. The queue monitoring unit 22, in the first period, counts a first number of commands transmitted to the first memory chip among the plurality of third commands stored in the first queue and determines the first command transmission speed based on the counted first number. In addition, the queue monitoring unit 22, in the first period, counts a second number of commands transmitted to the second memory chip among the plurality of fourth commands stored in the second queue and determines the second command transmission speed based on the counted second number.

Furthermore, in a case where the first command is a program command for writing the first data in a memory chip associated with the first queue, and the second command is a program command for writing the second data in a memory chip associated with the second queue, the arbiter 422 operates as below. In other words, (1) in a case where the first command processing speed is lower than the second command processing speed, or the first command transmission speed is lower than the second command transmission speed, the arbiter 422 instructs a memory chip to execute program by transmitting first data to the memory chip associated with the first queue and thereafter instructs a memory chip to execute program by transmitting second data to the memory chip associated with the second queue. In addition, (2) in a case where the second command processing speed is lower than the first command processing speed, or the second command transmission speed is lower than the first command transmission speed, the arbiter 422 instructs a memory chip to execute program by transmitting second data to the memory chip associated with the second queue and thereafter instructs a memory chip to execute program by transmitting first data to the memory chip associated with the first queue.

The operation of the flash controller engine 13 will be described with reference to FIGS. 18 to 21. Here, while the operation in a channel CH0 will be described as an example, operations in the other channels are similar thereto.

Figure 18:
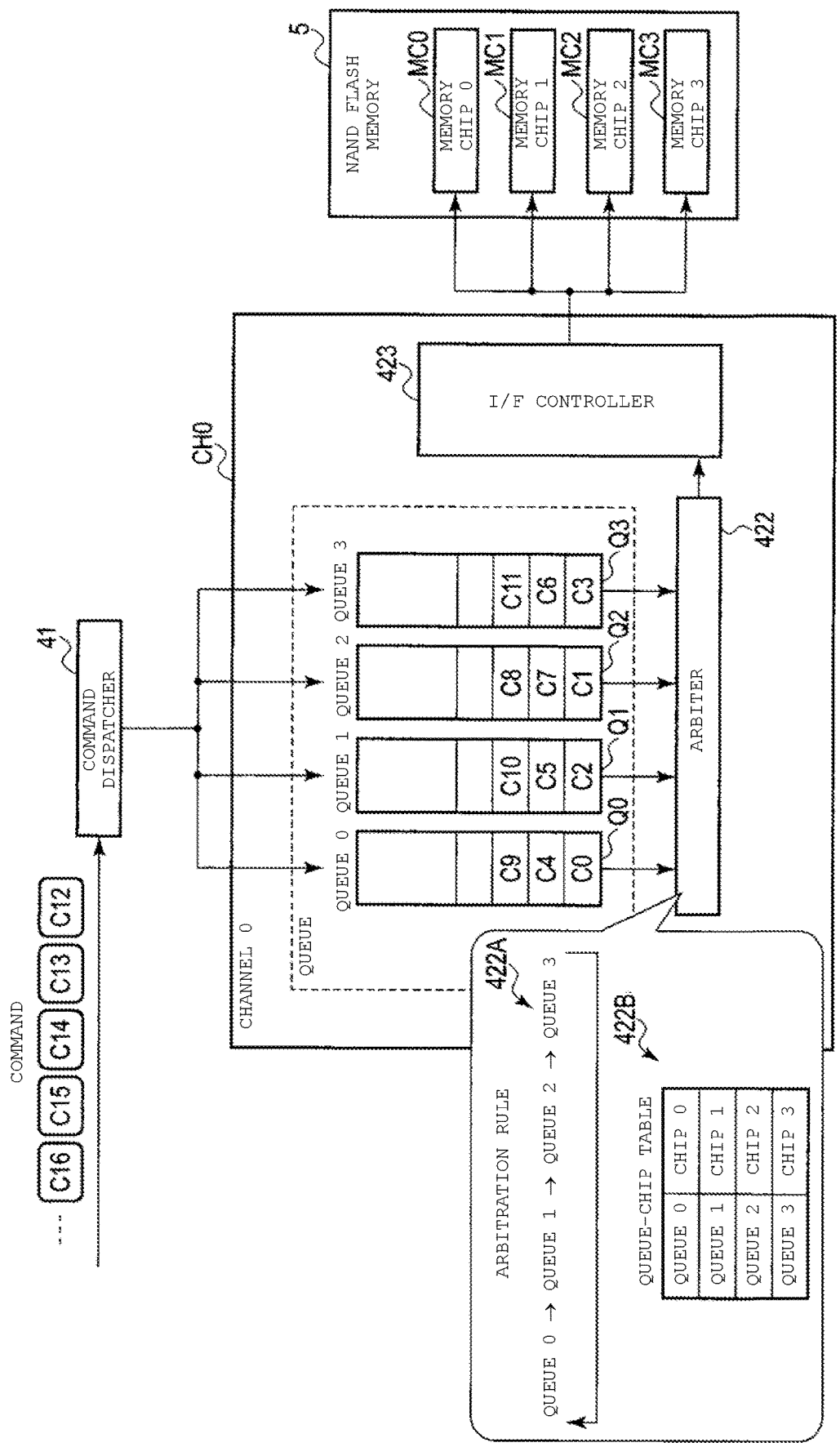
FIG. 18 is a diagram illustrating an example in which a plurality of commands received by a flash controller engine is stored in queues based on a queue-chip table.

FIG. 18 illustrates an example in which commands are stored in queues Q0 to Q3 in accordance with distribution using the command dispatcher 41. In the queues Q0 to Q3, commands to be executed by corresponding memory chips MC0 to MC3 are respectively stored in accordance with a queue-chip table 422B. The queue-chip table 422B represents that the queues Q0, Q1, Q2, and Q3 and the memory chips MC0, MC1, MC2, and MC3 are respectively associated with each other.

Accordingly, in the queue Q0, commands C0, C4, and C9 to be executed by the corresponding memory chip MC0 are stored. In the queue Q1, commands C2, C5, and C10 to be executed by the corresponding memory chip MC1 are stored. In the queue Q2, commands C1, C7, and C8 to be executed by the memory chip MC2 are stored. In addition, in the queue Q3, commands C3, C6, and C11 to be executed by the memory chip MC3 are stored.

The arbiter 422 acquires commands stored in the queues Q0 to Q3 in accordance with the order represented by the arbitration rule 422A and causes the memory chips MC0 to MC3 corresponding to the queues Q0 to Q3 to execute processes according to the acquired commands. In the example illustrated in FIG. 18, the arbitration rule 422A represents that the order of queues in which a command becomes a transmission target is an order of queues Q0, Q1, Q2, and Q3.

Figure 19:
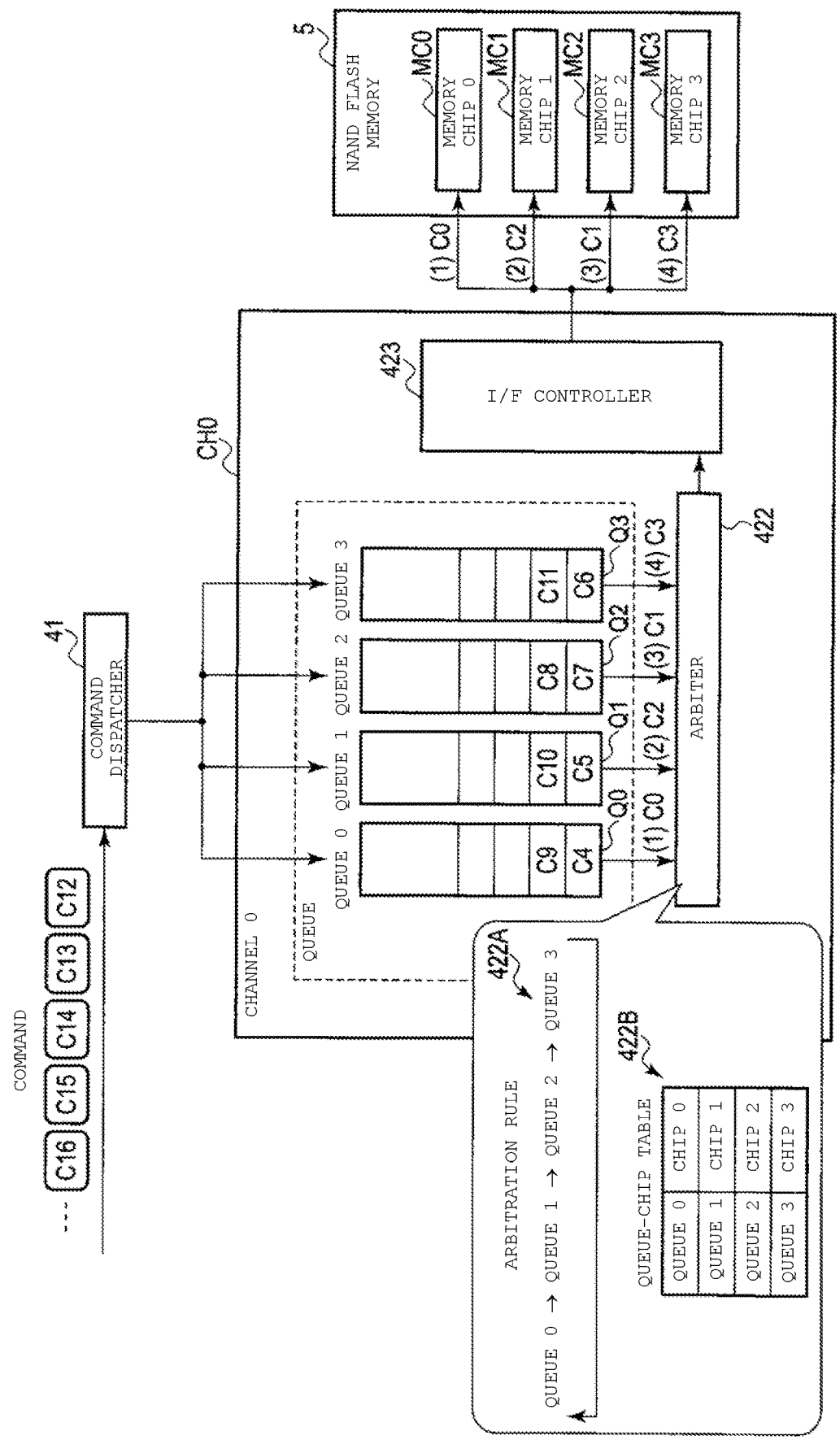
FIG. 19 is a diagram illustrating an example in which commands stored in queues are transmitted based on an arbitration rule.

As illustrated in FIG. 19, the arbiter 422 operates as below in accordance with the arbitration rule 422A.

(1) The command C0 is acquired from the queue Q0, and the command C0 is transmitted to the corresponding memory chip MC0 (the memory chip MC0 is caused to execute a process according to the command C0).

(2) The command C2 is acquired from the queue Q1, and the command C2 is transmitted to the corresponding memory chip MC1 (the memory chip MC1 is caused to execute a process according to the command C2).

(3) The command C1 is acquired from the queue Q2, and the command C2 is transmitted to the corresponding memory chip MC2 (the memory chip MC2 is caused to execute a process according to the command C1).

(4) The command C3 is acquired from the queue Q3, and the command C3 is transmitted to the corresponding memory chip MC3 (the memory chip MC3 is caused to execute a process according to the command C3).

The other commands C4 to C11 stored in the queues Q0 to Q3 are transmitted to corresponding memory chips MC0 to MC3 in a similar order.

By monitoring such an operation, the queue monitoring unit 22 acquires the command transmission speed of each queue or a command processing speed of each of a plurality of sets of a queue and a memory chip. The command transmission speed, as described above, for example, is acquired by counting at least one of the number of process start positions and the number of process end positions of commands within the unit period for each queue. In addition, a command processing speed is acquired based on an elapsed time from a process start position to a process end position of a command.

Figure 20:
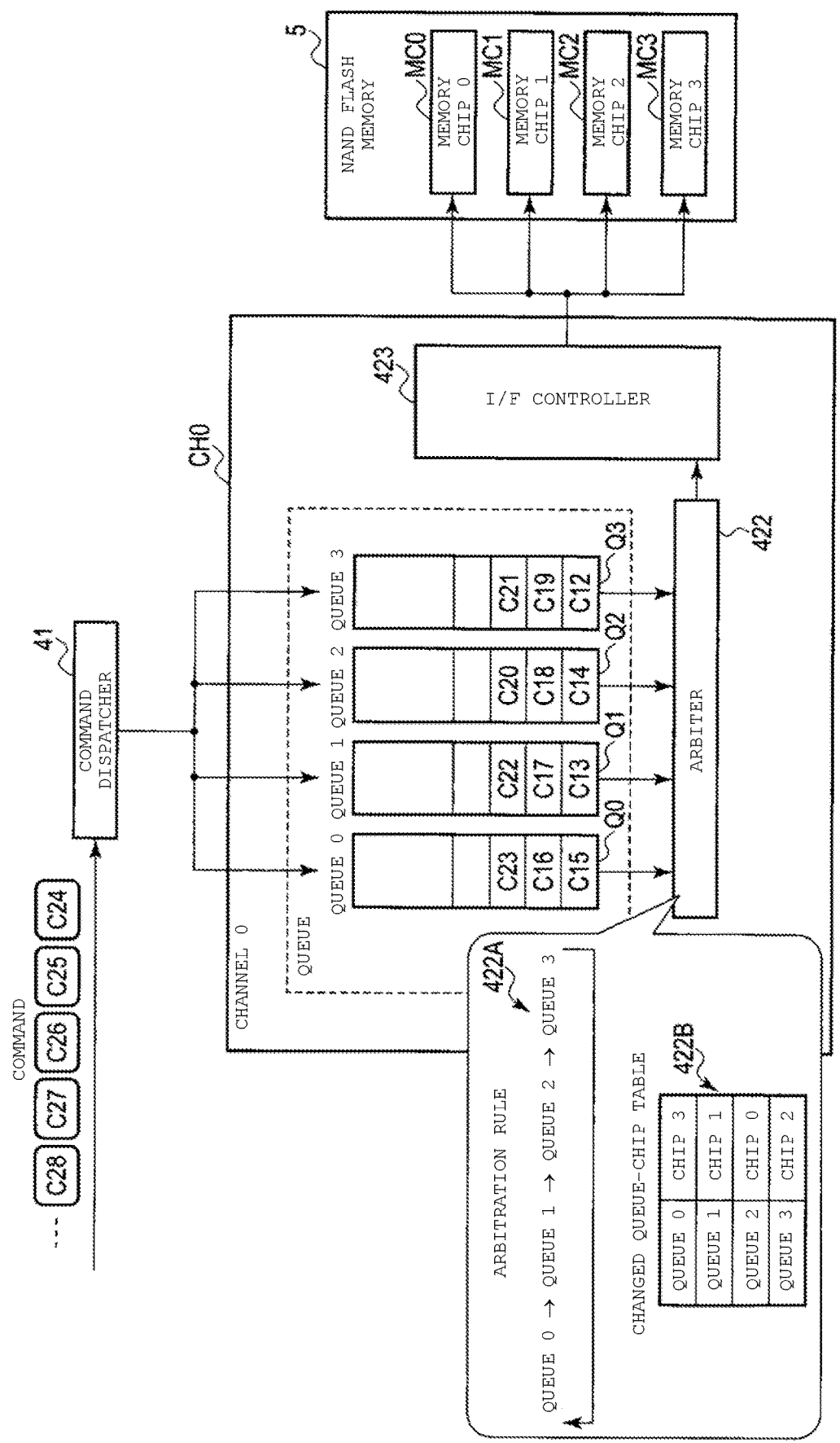
FIG. 20 is a diagram illustrating an example in which commands are stored in the queues based on a queue-chip table set in accordance with command transmission speeds of queues.

As illustrated in FIG. 20, in a case where the command transmission speed or the command processing speed that is acquired, for example, represents being lower in the order of queues Q3, Q1, Q0, and Q2, the arbiter 422 changes the queue-chip table 422B such that a memory chip associated with a queue having a lower command transmission speed or command processing speed is associated with a queue having an earlier order, in which a command becomes a transmission target, which is represented by the arbitration rule 422A. Thus, the queue-chip table 422B after the change represents that the memory chips MC3, MC1, MC0, and MC2 are respectively associated with the queues Q0, Q1, Q2, and Q3.

The command dispatcher 41 stores commands C12 to C23 sent to the flash controller engine 13 in queues corresponding to memory chips in which the commands are to be executed in accordance with the queue-chip table 422B after the change.

Figure 21:
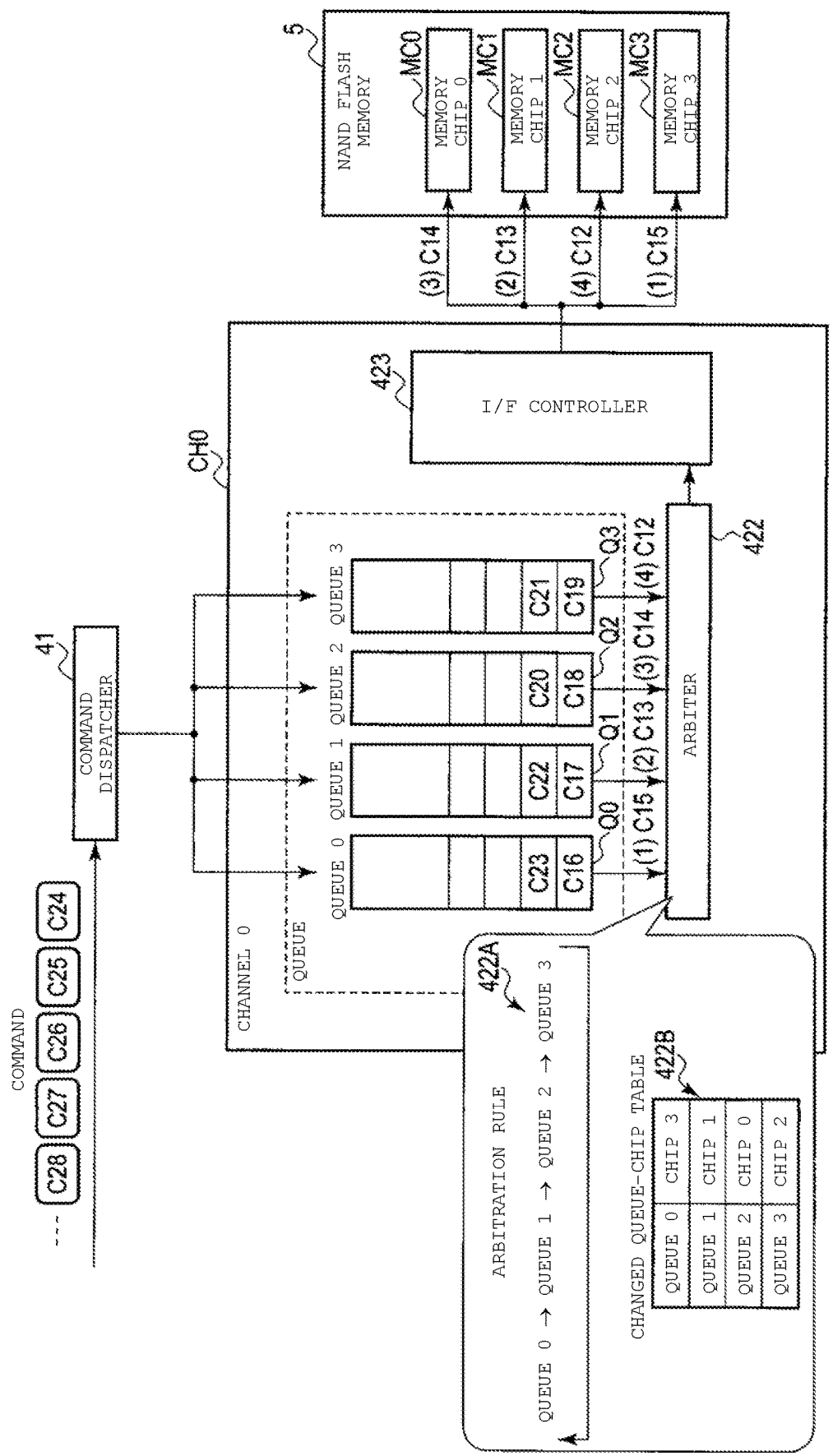
FIG. 21 is a diagram illustrating an example in which commands stored in queues are transmitted based on an arbitration rule.

As illustrated in FIG. 21, the arbiter 422 acquires commands stored in the queues Q0 to Q3 in accordance with the arbitration rule 422A and causes corresponding memory chips MC0 to MC3 to execute processes according to the acquired commands. More specifically, the arbiter 422, for example, operates as below.

(1) The command C15 is acquired from the queue Q0, and the command C15 is transmitted to the corresponding memory chip MC3 (the memory chip MC3 is caused to execute a process according to the command C15).

(2) The command C13 is acquired from the queue Q1, and the command C13 is transmitted to the corresponding memory chip MC1 (the memory chip MC1 is caused to execute a process according to the command C13).

(3) The command C14 is acquired from the queue Q2, and the command C14 is transmitted to the corresponding memory chip MC0 (the memory chip MC0 is caused to execute a process according to the command C14).

(4) The command C12 is acquired from the queue Q3, and the command C12 is transmitted to the corresponding memory chip MC2 (the memory chip MC2 is caused to execute a process according to the command C12).

In this way, the queue-chip table 422B is changed such that a memory chip associated with a queue having a lower command transmission speed or command processing speed is associated with a queue having an earlier order in which a command becomes a transmission target, the order being represented by the arbitration rule 422A. Accordingly, also in a state in which the order of queues, in which a command becomes a transmission target, (arbitration rule) is fixed, for example, a command is transmitted first to a memory chip having a lower command execution speed, and accordingly, a total processing time for transmitting commands from the queues Q0 to Q3 to the memory chips MC0 to MC3 and executing the commands can be shortened. Accordingly, access performance to the NAND flash memory 5 including the memory chips MC0 to MC3 can be improved.

Figure 22:
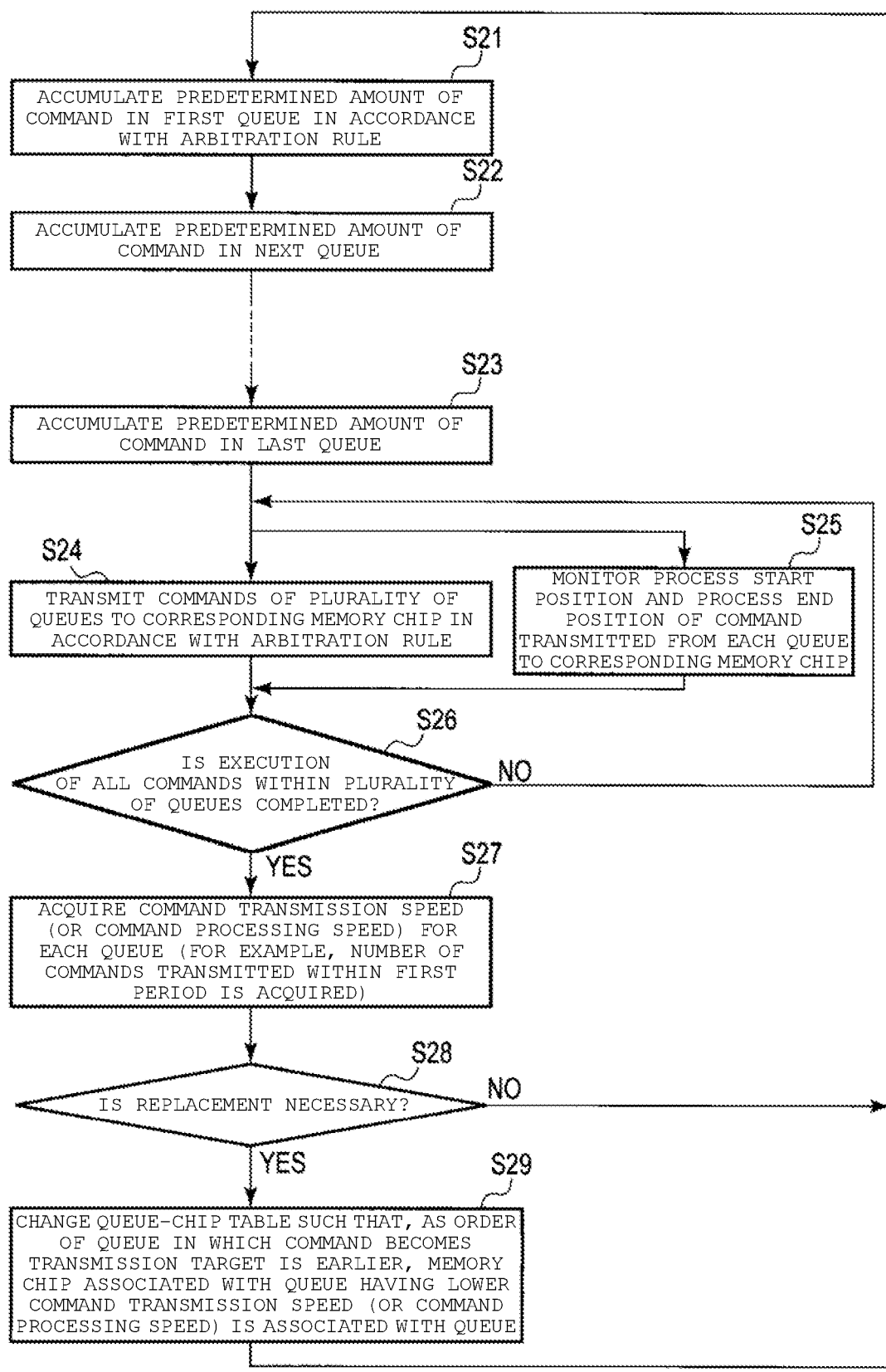
FIG. 22 is a flowchart illustrating an example of the sequence of a command transmission control process executed by a memory system according to the second embodiment.

Next, an example of the sequence of the command transmission control process executed by the controller 4 will be described with reference to a flowchart illustrated in FIG. 22.

First, the command dispatcher 41 accumulates a predetermined amount of commands in a first queue in accordance with the arbitration rules 422A and 432A (Step S21). Then, the command dispatcher 41 accumulates a predetermined amount of commands in the next queue (Step S22). Similarly, by accumulating a predetermined amount of commands in the queue in accordance with the order represented by the arbitration rules 422A and 432A, the command dispatcher 41 accumulates a predetermined amount of commands up to a queue of the last order (Step S23). Furthermore, the sequence of Steps S21 to S23 may be performed in parallel.

Subsequently, the arbiters 422 and 432 transmit commands stored inside a plurality of queues respectively to corresponding memory chips in accordance with the arbitration rules 422A and 432A (Step S24).

In parallel with the sequence of Step S24, the queue monitoring unit 22 monitors at least one of a process start position and a process end position of a command transmitted from each queue to a corresponding memory chip (Step S25). The queue monitoring unit 22, for example, counts at least one of the process start position and the process end position of a command for each queue. In addition, the queue monitoring unit 22 may measure a time of a process start position and a time of a process end position or an elapsed time from a process start position to a process end position.

Then, the arbiters 422 and 432 determine whether or not execution using memory chips for all the commands stored in a plurality of queues of a certain channel is completed (Step S26). In a case where execution of all the commands is not completed (No in Step S26), the process is returned to Steps S24 and S25, and transmission of a command and monitoring of at least one of the process start position and the process end position thereof are continued.

On the other hand, in a case where execution of all the command is completed (Yes in Step S26), the arbiters 422 and 432 acquire a command transmission speed within the first period for each queue (Step S27). The arbiters 422 and 432, for example, acquire the number of commands transmitted within the first period for each queue. The number of commands transmitted to memory chips within the first period, for example, is represented by at least one of the number of process start positions and the number of process end positions of commands that are counted within the first period in Step S25.

Next, the arbiters 422 and 432 determines whether or not a correspondence relation between a queue and a memory chip needs to be replaced based on the acquired command transmission speed of each queue (Step S28). For example, in a case where the command transmission speed of a queue is lower as the order of the queue in which a command becomes a transmission target is earlier, the arbiters 422 and 432 determine that the correspondence relation does not need to be replaced. On the other hand, in a case where the order of queues in which a command becomes a transmission target does not correspond to the order of lowest to highest command transmission speed, the arbiters 422 and 432 determine that the correspondence relation needs to be replaced.

In a case where the correspondence relation between a queue and a memory chip does not need to be replaced (No in Step S28), the process is returned to Step S21, and accumulation of commands in the queue is continuous.

On the other hand, in a case where the correspondence relation between a queue and a memory chip needs to be replaced (Yes in Step S28), the arbiters 422 and 432 change the queue-chip tables 422B and 432B such that, as the order of a queue in which a command becomes a transmission target is earlier, a memory chip associated with a queue having a lower command transmission speed is associated with the queue (Step S29), and the process is returned to Step S21.

Furthermore, in the sequence of Step S27, the arbiters 422 and 432 may acquire a command processing speed of each queue (memory chip). The arbiters 422 and 432, for example, acquire a command processing speed of each queue based on the time of the process start position and the time of the process end position measured in Step S25 or an elapsed time from the process start position to the process end position. In this case, in the sequence of Steps S28 and S29, the command processing speed is used instead of the command transmission speed.

As above, the correspondence relation (queue-chip table) between a queue and a memory chip is dynamically changed such that commands are transmitted from queues to memory chips in the order of lowest to highest command transmission speed or command processing speed of a plurality of queues corresponding to a plurality of memory chips connected to a certain channel. Accordingly, a delay occurring when commands are executed in parallel is decreased, and a total processing time for transmitting commands from a plurality of queues to a plurality of memory chips and executing the command can be shortened. Therefore, access performance to the NAND flash memory 5 including a plurality of memory chips can be improved.

Furthermore, also in a case where a plurality of memory chips are associated with one queue, the arbiters 422 and 432 can dynamically change the queue-chip tables 422B and 432B such that a plurality of memory chips associated with a queue having a lower command execution speed or command processing speed are associated with a queue having an earlier order in which a command becomes a transmission target. In this way, similarly, also in a case where a plurality of memory chips are associated with one queue, access performance to the NAND flash memory 5 including a plurality of memory chips can be improved.

As described above, according to the first and second embodiments, the access performance to a nonvolatile memory including a plurality of memory chips can be improved. The NAND flash memory 5 includes a plurality of memory chips including a first memory chip and a second memory chip that can operate in parallel. The controller 4 includes a plurality of queues including a first queue associated with the first memory chip and a second queue associated with the second memory chip, generates a first command to be executed by the first memory chip and a second command to be executed by the second memory chip, stores the first command in the first queue, and stores the second command in the second queue. When the first command processing speed based on the time until execution of a command using the first memory chip is completed after transmission of the command to the first memory chip is started is lower than the second command processing speed based on the time until execution of a command using the second memory chip is completed after transmission of the command to the second memory chip is started, the controller 4 acquires the first command from the first queue, transmits the acquired first command to the first memory chip, thereafter acquires the second command from the second queue, and transmits the acquired second command to the second memory chip. On the other hand, when the second command processing speed is lower than the first command processing speed, the controller 4 acquires the second command from the second queue, transmits the acquired second command to the second memory chip, thereafter acquires the first command from the first queue, and transmits the acquired first command to the first memory chip.

Accordingly, in a case where commands are executed in parallel (via execution of chip interleaving) using a plurality of memory chips having different access times, the process can be controlled such that the commands are executed in order starting from a memory chip having a lower command execution speed. The access performance for the NAND flash memory 5 having a plurality of memory chips can be improved.

Furthermore, in several embodiments of the present disclosure, a NAND flash memory is the nonvolatile memory. However, the functions of each embodiment can be also applied to various other types of nonvolatile memories such as a magnetoresistive random access memory (MRAM), a phase change random access memory (PCRAM), a resistive random access memory (ReRAM), and a ferroelectric random access memory (FeRAM).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system, comprising:
a plurality of nonvolatile memory chips including a first memory chip and a second memory chip accessible in parallel via different channels; and
a controller configured to:
maintain a first queue associated with the first memory chip and a second queue associated with the second memory chip,
measure a first command processing speed based on a plurality of command execution times for commands for the first memory chip sent from the first queue to the first memory chip,
measure a second command processing speed based on a plurality of command execution times for commands for the second memory chip sent from the second queue to the second memory chip,
change an ordering of queues including the first and second queues, the ordering of queues being based on measured differences between the first command processing speed and the second command processing speed, wherein the first queue is before the second queue in the ordering whenever the first command processing speed is lower than the second command processing speed, and the second queue is before the first queue in the ordering whenever the second command processing speed is lower than the first command processing speed,
store a first command to be executed by the first memory chip in the first queue,
store a second command to be executed by the second memory chip in the second queue,
select the first or second command for output from the respective first or second queue based on the ordering of queues, and
output the selected one of the first or second command from the respective first or second queue, then output the non-selected one of the first or second command from the respective first or second queue.

2. The memory system according to claim 1, wherein
the first command is one of a program command, a read command, or an erase command, and
the second command is one of a program command, a read command, or an erase command.

3. The memory system according to claim 1, wherein
the first command is a program command for writing first data in the first memory chip, and
the second command is a program command for writing second data in the second memory chip.

4. The memory system according to claim 1, wherein the controller is configured to establish the ordering of queues based solely on the measured differences between the first command processing speed and the second command processing speed.

5. The memory system according to claim 1, wherein the controller is further configured to dynamically change the ordering of queues based on the measured first and second command processing speeds.

6. The memory system according to claim 1, wherein the first command processing speed is measured based on at least one of a maximum value or a minimum value in the plurality of command execution times for commands for the first memory chip.

7. A memory system, comprising:
a nonvolatile memory including a plurality of memory chips including a first memory chip and a second memory chip that are capable of operating in parallel; and
a controller configured to:
maintain a plurality of queues including a first queue and a second queue in which commands are stored then transmitted to a memory chip, each queue in the plurality of queues being associated with a different memory chip in the plurality of memory chips,
measure a command processing speed for the first memory chip based on a time until completion of an execution of a command for the first memory chip,
measure a command processing speed for the second memory chip based on a time until completion of an execution of a command for the second memory chip,
after initially associating each queue with a different memory chip, change the association of the first queue to the first memory chip if the first memory chip has a slower measured command processing speed than the second chip, and change the association of the first queue to the second memory chip if the second memory chip has the slower measured command processing speed, after changing the association of the first queue, change the association of the second queue to the other one of the first or second memory chips having a faster measured command processing speed, store a first command in the first queue, store a second command in the second queue, and transmit the first command from the first queue to the one of the first or second memory chips associated with the first queue, then transmit the second command to the other one of the first or second memory chips associated with the second queue.

8. The memory system according to claim 7, wherein the controller is configured to measure the command processing speeds for the first and second memory chips by executing firmware.

9. The memory system according to claim 7, wherein the controller is configured by executing firmware to associate each queue in the plurality of queues with a memory chip in the plurality of memory chip according to a measured command processing speed of the memory chip.

10. The memory system according to claim 7, wherein
the first command is one of a program command, a read command, and an erase command, and
the second command is one of a program command, a read command, and an erase command.

11. The memory system according to claim 7, wherein
the first command is a program command for writing first data, and
the second command is a program command for writing second data.

12. A memory system, comprising:
a nonvolatile memory including a plurality of memory chips including a first memory chip and a second memory chip that are capable of operating in parallel; and
a controller having a plurality of queues including a first queue associated with the first memory chip and a second queue associated with the second memory chip and configured to:
measure a first command transmission speed based on a count of the number of commands transmitted to the first memory chip from the first queue during a predetermined period of time before a first command is received,
measure a second command transmission speed based on a count of the number of commands transmitted to the second memory chip from the second queue during the predetermined period of time before the first command is received,
change an output order for the plurality of queues based on differences in measured command transmission speed for commands from the respective queues of the plurality of queues to a respectively associated memory chip in the plurality of memory chips, wherein the first queue is set to be before the second queue in the output order whenever the measured first command transmission speed is lower than the measured second command transmission speed, and the second queue is set to be before the first queue in the output order whenever the measured second command transmission speed is lower than the measured first command transmission speed;

receive a first command to be executed by the first memory chip;

store the first command in the first queue;

receive a second command to be executed by the second memory chip;

store the second command in the second queue; and output the first or second command from the respective first or second queue according to the output order for the plurality of queues, then output the other one of the first or second command from the respective first or second queue according to the output order for the plurality of queues.

13. The memory system according to claim 12, wherein the controller is further configured to:
generate a plurality of third commands to be executed by the first memory chip and store the plurality of third commands in the first queue;
generate a plurality of fourth commands to be executed by the second memory chip and store the plurality of fourth commands in the second queue;
count, as a first number, the number of process start positions within a predetermined period for third commands transmitted to the first memory chip plus the number of process end positions for third commands executed by the first memory chip within the predetermined period;
count, as a second number, the number of process start positions within the predetermined period for fourth commands transmitted to the second memory chip plus the number of process end positions for fourth commands executed by the second memory chip within the predetermined period;
measure the first command transmission speed based on the first number; and
measure the second command transmission speed based on the second number.

14. The memory system according to claim 12, wherein
the first command is one of a program command, a read command, and an erase command, and
the second command is one of a program command, a read command, and an erase command.

15. The memory system according to claim 12, wherein
the first command is a program command for writing first data in the first memory chip, and
the second command is a program command for writing second data in the second memory chip.

16. The memory system according to claim 12, wherein the controller is further configured to dynamically change the output order for the plurality of queues based on the measured first and second command transmission speeds.

17. A memory system, comprising:
a nonvolatile memory including a plurality of memory chips including a first memory chip and a second memory chip that are capable of operating in parallel; and
a controller configured to:
maintain a plurality of queues into which commands are stored then transmitted to a memory chip, each queue in the plurality of queues being associated with a different memory chip in the plurality of memory chips,
measure a first command transmission speed based on a count of the number of commands transmitted to the first memory chip during a predetermined period of time, measure a second command transmission speed based on a count of the number of commands transmitted to the second memory chip during the predetermined period of time, if the first memory chip is not already associated with the first queue, change the association of the first memory chip to the first queue if the measured first command transmission speed is slower than the measured second command transmission speed, and, if the second memory chip is not already associated with the first queue, change the association of the second memory chip to the first queue if the measured second command transmission speed is slower than the measured first command transmission speed, after changing the association of the first queue, change the association of the second queue to the other one of the first or second memory chips having the faster command transmission speed, store a first command in the first queue, store a second command in the second queue, and transmit the first command from the first queue to the one of the first or second memory chips associated with the first queue, then transmit the second command to the other one of the first or second memory chips associated with the second queue.

18. The memory system according to claim 17, wherein the controller is further configured to:

generate a plurality of third commands to be executed and store the plurality of third commands in the first queue;

generate a plurality of fourth commands to be executed and store the plurality of fourth commands in the second queue;

count, as a first number, the number of process start positions within a predetermined period for third commands transmitted to the first memory chip plus the number of process end positions for third commands executed by the first memory chip within the predetermined period;

count, as a second number, the number of process start positions within the predetermined period for fourth commands transmitted to the second memory chip plus the number of process end positions for fourth commands executed by the second memory chip within the predetermined period;

measure the first command transmission speed based on the first number; and measure the second command transmission speed based on the second number.

19. The memory system according to claim 17, wherein the first command is one of a program command, a read command, and an erase command, and the second command is one of a program command, a read command, and an erase command.

20. The memory system according to claim 17, wherein the controller is further configured to measure the first and second command transmission speeds a plurality of times and change the associations of the queues in the plurality of queues after each of the measurements of the first and second command transmission speeds.

\* \* \* \* \*